(12) United States Patent
Williamson

(10) Patent No.: US 11,004,145 B2
(45) Date of Patent: May 11, 2021

(54) CONVERTING SOLAR OUTPUT MEASURE TO COMMERCIAL RENT PER SQUARE AREA

(71) Applicant: Key Solar Solutions, LLC, Dallas, TX (US)

(72) Inventor: Kirk Williamson, Dallas, TX (US)

( * ) Notice: Subject to any disclaimer, the term of this patent is extended or adjusted under 35 U.S.C. 154(b) by 124 days.

(21) Appl. No.: 16/166,252

(22) Filed: Oct. 22, 2018

(65) Prior Publication Data
US 2019/0057440 A1  Feb. 21, 2019

Related U.S. Application Data

(63) Continuation-in-part of application No. 15/374,425, filed on Dec. 9, 2016, now Pat. No. 10,666,187.

(51) Int. Cl.
| | |
|---|---|
| *G06Q 30/06* | (2012.01) |
| *G06Q 30/02* | (2012.01) |
| *G06Q 40/02* | (2012.01) |
| *H02S 20/22* | (2014.01) |
| *G06F 30/13* | (2020.01) |

(52) U.S. Cl.
CPC ......... *G06Q 30/0645* (2013.01); *G06F 30/13* (2020.01); *G06Q 30/0283* (2013.01); *G06Q 40/025* (2013.01); *H02S 20/22* (2014.12); *Y02B 10/10* (2013.01)

(58) Field of Classification Search
CPC ........................ G06Q 30/0283; G06Q 30/0645
USPC .......................................................... 703/18
See application file for complete search history.

(56) References Cited

U.S. PATENT DOCUMENTS

| | | | | |
|---|---|---|---|---|
| 7,580,817 B2* | 8/2009 | Bing | ............... | G01W 1/10 703/6 |
| 7,904,382 B2* | 3/2011 | Arfin | ............... | G06Q 30/0601 705/38 |
| 8,145,578 B2* | 3/2012 | Pershing | ............... | G06Q 10/00 |
| 8,175,964 B2* | 5/2012 | Arfin | ............... | G06Q 30/0601 705/1.1 |
| 8,249,902 B2* | 8/2012 | Arfin | ............... | G06Q 50/06 705/7.11 |
| 2010/0057544 A1* | 3/2010 | Tarbell | ............... | G06Q 30/0207 705/14.1 |
| 2010/0057582 A1* | 3/2010 | Arfin | ............... | G06Q 30/08 705/26.1 |
| 2011/0137752 A1* | 6/2011 | Arfin | ............... | G06Q 40/00 705/26.61 |
| 2011/0173110 A1* | 7/2011 | Tarbell | ............... | G06Q 50/06 705/34 |
| 2014/0005845 A1* | 1/2014 | Thomas | ............... | H02J 3/381 700/291 |
| 2014/0025343 A1* | 1/2014 | Gregg | ............... | G06F 30/13 703/1 |

(Continued)

*Primary Examiner* — Sheree N Brown
(74) *Attorney, Agent, or Firm* — Kirk Williamson; Steve Williamson; Jon Cameron

(57) ABSTRACT

A method of designing bifacial solar panels installations that does not rely on the use of all available space to maximize electrical output and return on investment. Instead, the design method relies the market meter rate of the business sector in the area to determine of the KW size of the array. This production is then converted to cost per square Area for use in evaluating the costs, predicting profits, and generating lease agreements. The tenant pays a contract cost per square Area regardless of actually energy consumption.

1 Claim, 13 Drawing Sheets

(56) References Cited

U.S. PATENT DOCUMENTS

Figure 1:
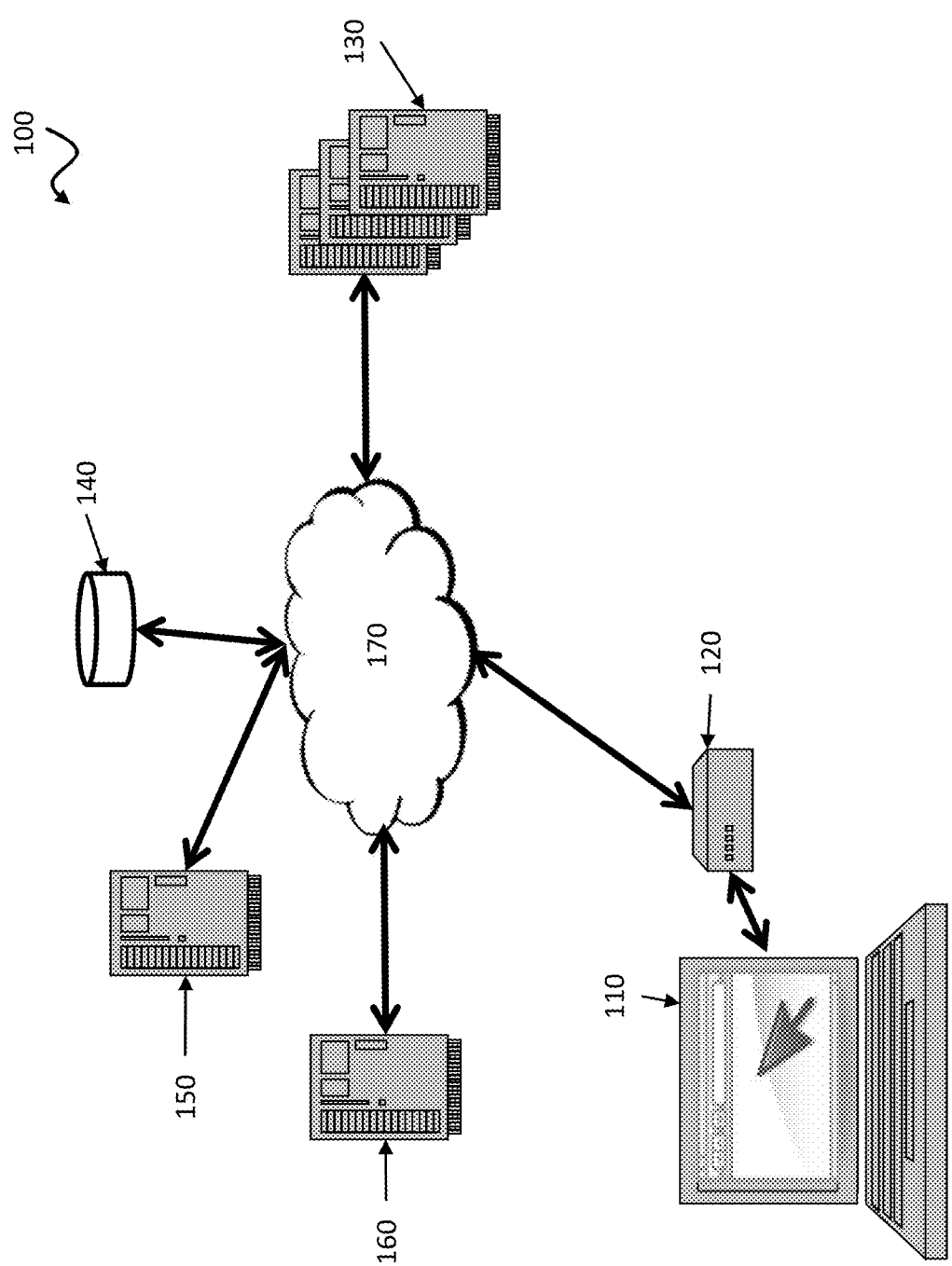

2015/0066442 A1\* 3/2015 Pryor ................ G06Q 10/10
 703/1
2015/0331972 A1\* 11/2015 McClure ............ G06F 17/11
 703/2

\* cited by examiner

CONVERTING SOLAR OUTPUT MEASURE TO COMMERCIAL RENT PER SQUARE AREA

CROSS-REFERENCE TO RELATED APPLICATIONS

This application is a continuation-in-part of application Ser. No. 15/374,425 filed on Dec. 9, 2016 and entitled "Less Than Maximum Effective Solar Design" which a claim of priority is made based on Provisional Application Ser. No. 62/412,878 filed on Oct. 26, 2016 and entitled "Less Than Maximum Effective Solar Design" the disclosures of which are hereby incorporated by reference in their entirety.

BACKGROUND—FIELD OF INVENTION

The invention related to the system and method of designing a bifacial solar panel installation and converting the solar production measure to a tenant's rent per square Area regardless of tenant's energy consumption.

BACKGROUND OF THE INVENTION

The present invention is a useful and novel method for planning the installation design of a bifacial solar system and providing property owners, or managers, with costs, profits, and output based on a measure by per square Area. A tenant is then rented solar energy by the square Area of rentable space instead of by the amount of energy consumed by the tenant.

Solar energy is generated by photovoltaic (PV) cells inside a solar panel. Photovoltaic cells collect solar radiation and convert that radiation to variable direct current (DC). A solar panel, also referred to as a solar module, contains a series of photovoltaic cells. The modules are then either roof or ground mounted in a series. A limited number of panels are grouped by the same inverter and referred to as an array. The inverter, also referred to as a converter, is responsible for converting the variable direct current output of a photovoltaic solar panel into a utility frequency alternating current (AC) that can be fed into an electrical network. A photovoltaic system, or installation, or farm, comprises a group of solar arrays and the balance-of-system components. Besides inverters, balance-of-system components include meters, instrumentation, safety equipment, and power-conditioning equipment.

Due to the previous high costs of PV cells, solar energy was slow to be adopted. Initial consumer adoptions were limited to small electronics such as outdoor lighting. Large scale early adoptions were primarily by governments for remote or space energy needs. Only relatively recently, the hardware's cost per watt has been reduced enough to provide commercial buyers with a justifiable economic return.

Despite being around since the 1970s, bifacial solar panels are still emerging in the commercial building markets. The market penetration of these installations remains in the low single digit. The high cash outlay, cost per watt, low bifacial gain in some geographies, roof design requirements and low bifacial module availability have limited the market.

Bifacial solar means that both faces, also referred to as sides, of the module are designed to generate energy. Each side of the panel is comprised of transparent encapsulating material with glass as the most common material. This is different than a traditional solar panel that is monofacial and therefore only the front side, or the side facing the sun, generates energy. The front side of the bifacial panel is orientated toward the sun and collects incident light directly from the sun. The back side of the bifacial panel allows reflected light from surfaces surrounding the panel to be collected. The proportion of the incident light that is reflected by a surface is albedo light. So rather than enclose the back side of the panel with a reflective material, as in a monofacial design, glass is used in its place to allow sunlight through the rear panel. The two glass panels enclose a sheet of bifacial PV cells. Other designs include pod-like bifacial PV cells that allow light to penetrate from the front glass surface of the cell directly through the back-glass surface of the cell. Another design uses a front design like that used in traditional panels with industry-standard screen-printed PV cells but replaces the reflective aluminum back with a finger grid embedded in glass. Other designs incorporate a frameless structure of the bi-facial panels.

The relative additional energy obtained by a bifacial system compared to a monofacial reference is expressed as bifacial gain and credited to the gain by the back panel. Today, bifacial gain is generally believed to about a 10 (ten) to 25 (twenty-five) percent improvement over a monofacial solar panel but some manufacturers are claiming gains nearing an average of 50 (fifty) percent. For the initial cost analysis, the manufacturer of the panel will provide more exact results by geography. Individual studies show a large variation from day to day ranging from 0 (zero) percent to 240 (two hundred and forty) percent. Bifacial gains in snowy regions have sometimes been more than 60 (sixty) percent as the front face is covered with snow and the highly-reflective snow has a high albedo. Depending on the orientation of the module, the module may generate more power from the front of the panel during the first part of the day and then more from the back during the remainder of the sun duration. In addition to the bifacial gain, the bifacial modules have lower operating temperatures which results in a higher energy yield. It is also possible to increase the output from a bifacial installation by using trackers, mounting that follows the path of the sun, because the clearance increases the amount of light falling on the back panel.

While this specification will focus on rooftop commercial applications, the ability of the bifacial module to collect light on both sides, combined with their ability to let light pass through the two faces, have introduced new placement possibilities for architects and engineers. These include:
  Traffic sound barriers, even on curved roads.
  Glass roofs that both harvest the sun and provide interior lighting.
  Vertical railing for buildings especially on roof perimeters.
  Awnings and terrace roofing to limit the amount of light but keep some natural light.
  Carports that provide reflected light even when populated with vehicles.
  Skylights.
  Fences.
  Canopies.
  Building facades.

For buyers, bifacial panels are inherently higher in cost than traditional monofacial panels because they use a more expensive PV silicon cell, require two panes of glass and have lower production volume. The two glass panes combined are heavier than a traditional panel which also increases the costs of handling, shipping, racking and labor. Taken together, the bifacial panel installation can be upwards of 40% (forty percent) higher in final cash outlay.

The roof of the rooftop installation serves the primary function of providing reflected light to the back side of the panel. As such, the roof of the commercial building may require improvements to provide optimized reflectivity to the back panel. These costs include engineering and design; roofing materials such as a new membrane and flashing and adhesive; and labor. These may cost the average building owners an additional US $5 (five dollars) per square foot at the time of this application. Added to the additional cost of bifacial panels over traditional panels, the new roofing costs have contributed significantly to the low market penetration that bifacial panels suffer today. Even with the bifacial gain, the additional solar and roof cost increase the breakeven point, often to unacceptable levels.

To overcome these problems, planners must innovate in the design of the installation. Traditional panel installation design rules lay at the heart of failed bifacial installation projects. The maxim for monofacial installation is to maximize the energy output which then maximizes the energy offset of the building. This result is a maximum panel density design. A maximum density design provides the highest count of modules the designer can place where the number approached the calculated maximum number of modules. However, with average energy gains of a bifacial panel averaging only 20% (twenty percent) and the installed cost nearly doubling for bifacial, it is impossible to justify a bifacial installation based on maximum effective energy output or offset.

All the traditional and bifacial solar installations heretofore known suffer from a number of disadvantages:
1. The designs rely on maximizing to total available outside space to drive return on investment;
2. The designs increase long-term maintenance costs;
3. The designs increase long-term replacement costs;
4. The designs fail to meet financial objectives of commercial users.

The next process for the building owner is financing the solar design plan for installation. The majority of the options available to the owner are termed solar leasing, solar rental, power purchase agreement (PPA) or solar services agreement (SSA). Investment groups are established with the sole purpose of financing solar installation on third-party properties.

A power purchase agreement (PPA) is a solar system finance agreement for a developer (energy seller) to design, install, finance and maintain a solar installation for little to no cost to the property owner (host). In exchange, the property owner or utility (buyer), agrees to purchase a set amount kWh from the seller. There are many variations on the terms and the party responsibilities for a PPA. However, the agreements are specifically focused on the sale of a set amount energy between a seller and buyer. Most commonly, the buyer is a single entity. One of the key benefits of a PPA is that by clearly establishing the known output of the solar system, the seller is able to obtain non-recourse financing from a financing counterparty such as a bank. The seller in the a PPA agreement is organized as special purpose entity. As instruments for both an energy provider and energy seller, PPAs are regulated by the Federal Energy Regulatory Commission in the United States and other regulatory bodies across world governments. They may also be regulated at the state, territory, district and local levels.

A solar services agreement (SSA) may be a lease or PPA and is a finance agreement with a developer to provide power at a cost equal to or lower per kWh than the local centralized utility. For the purposes of this invention, the seller is a developer. The developer installs, operates, owns, and finances a solar system installed on a host building. The host agrees to purchase the energy output from the developer's solar systems. This agreement allows the host to receive stable and often low-cost electricity, while the developer enjoys the valuable financial benefits, such as up-front incentives, tax credits and the profit from the sale of electricity. The framework of these agreements is referred to as the solar services model, and the developers who offer SSAs are known as solar services providers. SSAs are specifically focused on a sale of a set amount energy between a seller and host buyer.

Solar energy leases go under various forms including finance lease, true leases, leveraged lease, structured operating lease, capital lease, single investor lease, system integrator lease, etc. Each type provides different advantages including lower or no initial costs, lower monthly cost, shorter terms, favorable accounting, operational controls, off balance-sheet financing, tax advantages, covered repair and maintenance costs, and repurchase rights. All these leases focus on the purchase of solar energy by the host directly from the developer in exchange for allowing the developer to use their property to generate the energy sold to the host. The advantage is the host does not incur the cost of building the solar system and is able to purchase solar energy below the retail market energy rate.

All the solar lease agreements heretofore known suffer from a number of disadvantages:
1. The designs rely on sub-metering to determine tenant's energy consumption.
2. The systems size is determined by anticipated energy needs of the host building.
3. Energy costs are presented as a measure of energy, kWh, that make capital expenditure comparisons impossible.
4. Tenant energy costs are unstable and unpredictable to the tenant.
5. Tenants pay for energy.

SUMMARY OF THE INVENTION

An invention, which meets the needs stated above, is a system and method to increase the market penetration of bifacial modules by providing a design methodology that fails to maximize total output in exchange for lower cost for energy for the buyers. The buyer then converts the total month's costs of the energy into a cost per square Area for the purposes of using the Area energy costs to determine a rental rate for the energy available to their tenants. The tenant is charged rent per square Area independent of the tenant's actual energy usage.

Objects and Advantages

Accordingly, besides the objects and advantages of the system and methods for converting solar output measures to a commercial rent per square area described above, several objects and advantages of the present invention are:
a) to provide panel manufacturers with design methodology that meets market requirements;
b) to provide seller with design tools that allow the seller to match the farm's design to the non-effective criteria of the buyer;
c) matching the cost per Area measure used to evaluate other capital projects;
d) providing a predictable and stable monthly cost for energy to the tenant;
e) provide stable and new income to the building owners;

f) eliminating the expense of sub-metering;

g) planning the size of the solar system based on the market meter rate of the subsector in the local market;

h) to provide designers with lower hardware and communication costs to manage design software system requirements.

Further objects and advantages of this invention will become apparent from a consideration of the drawings and the ensuing description of the drawings.

DRAWING FIGURES

The accompanying drawings, which are incorporated in and constitute a part of this specification, illustrate embodiments of the present invention and together with the description, serve to explain the principles of this invention. In the figures:

FIG. 1.—Diagram of a networked environment.

Figure 2:
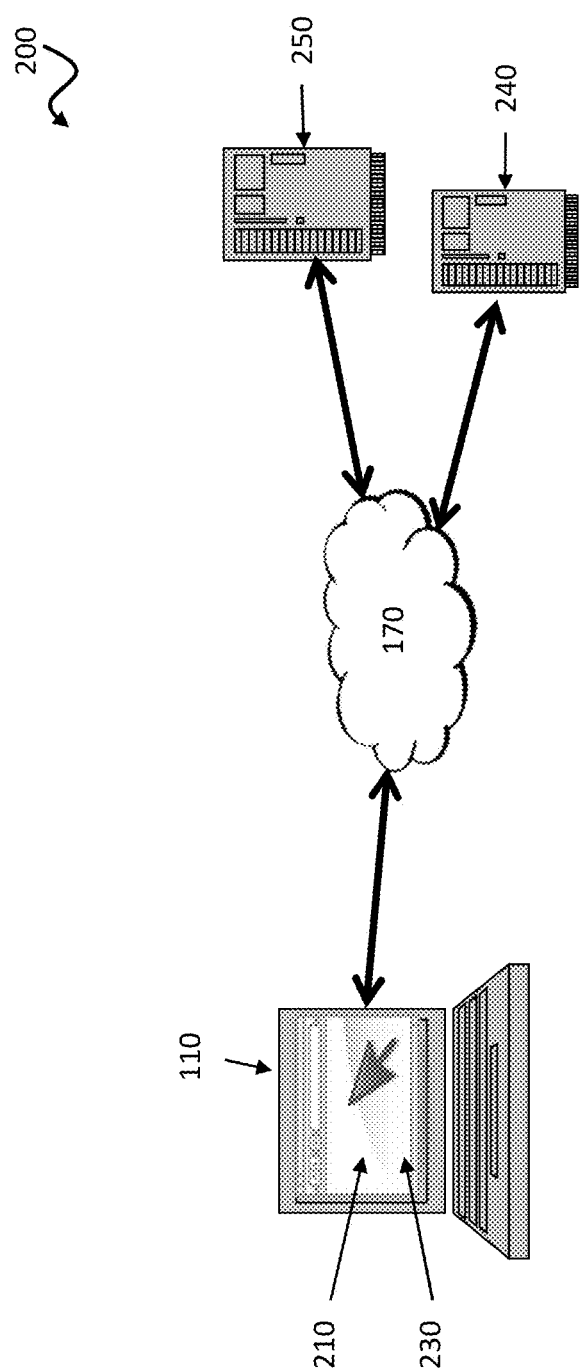

FIG. 2.—Diagram illustrating a network environment for an analytics and design system.

Figure 3:
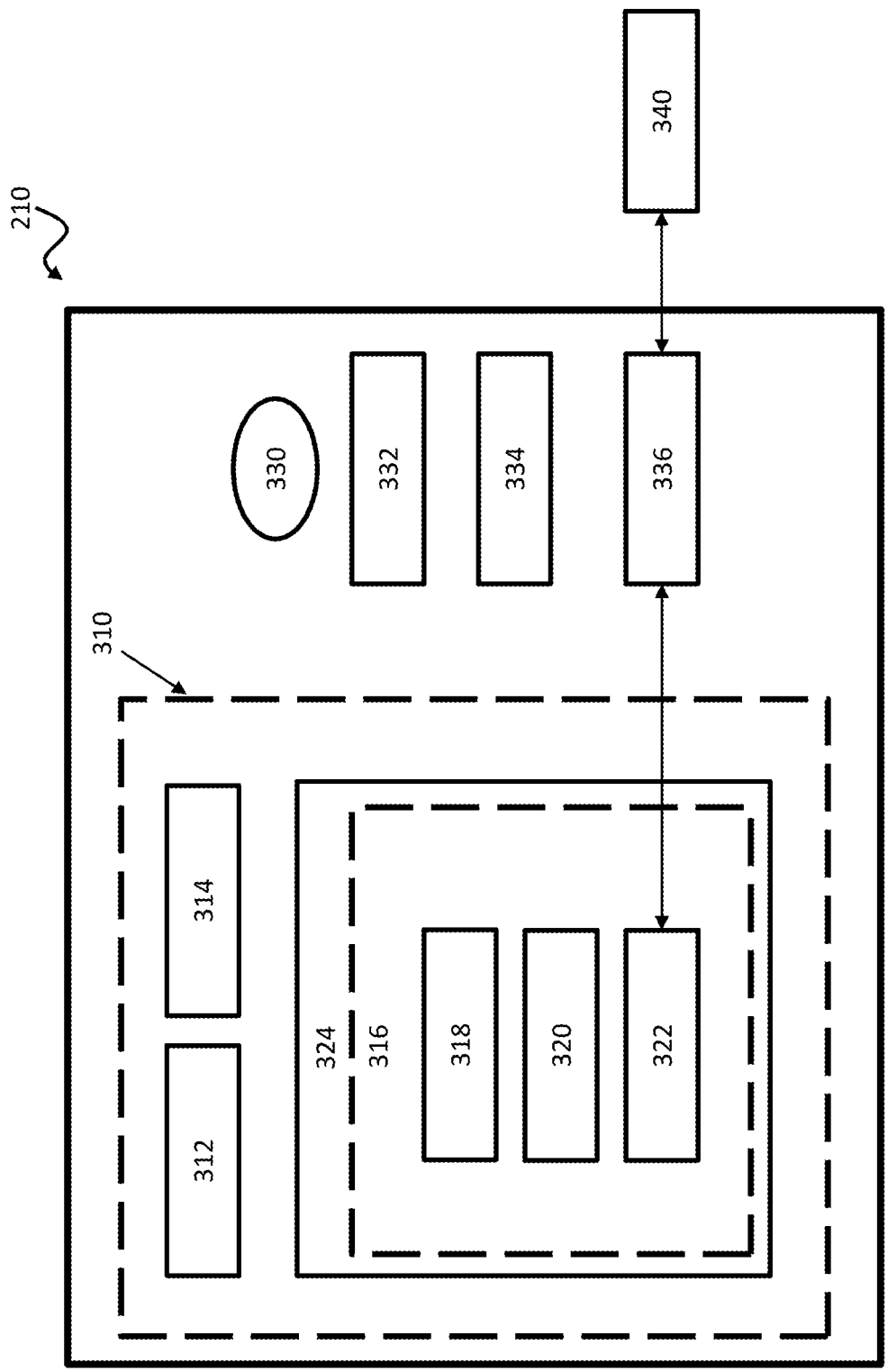

FIG. 3.—A general illustration of a computing environment in which the present embodiments may be implemented.

Figure 4A:
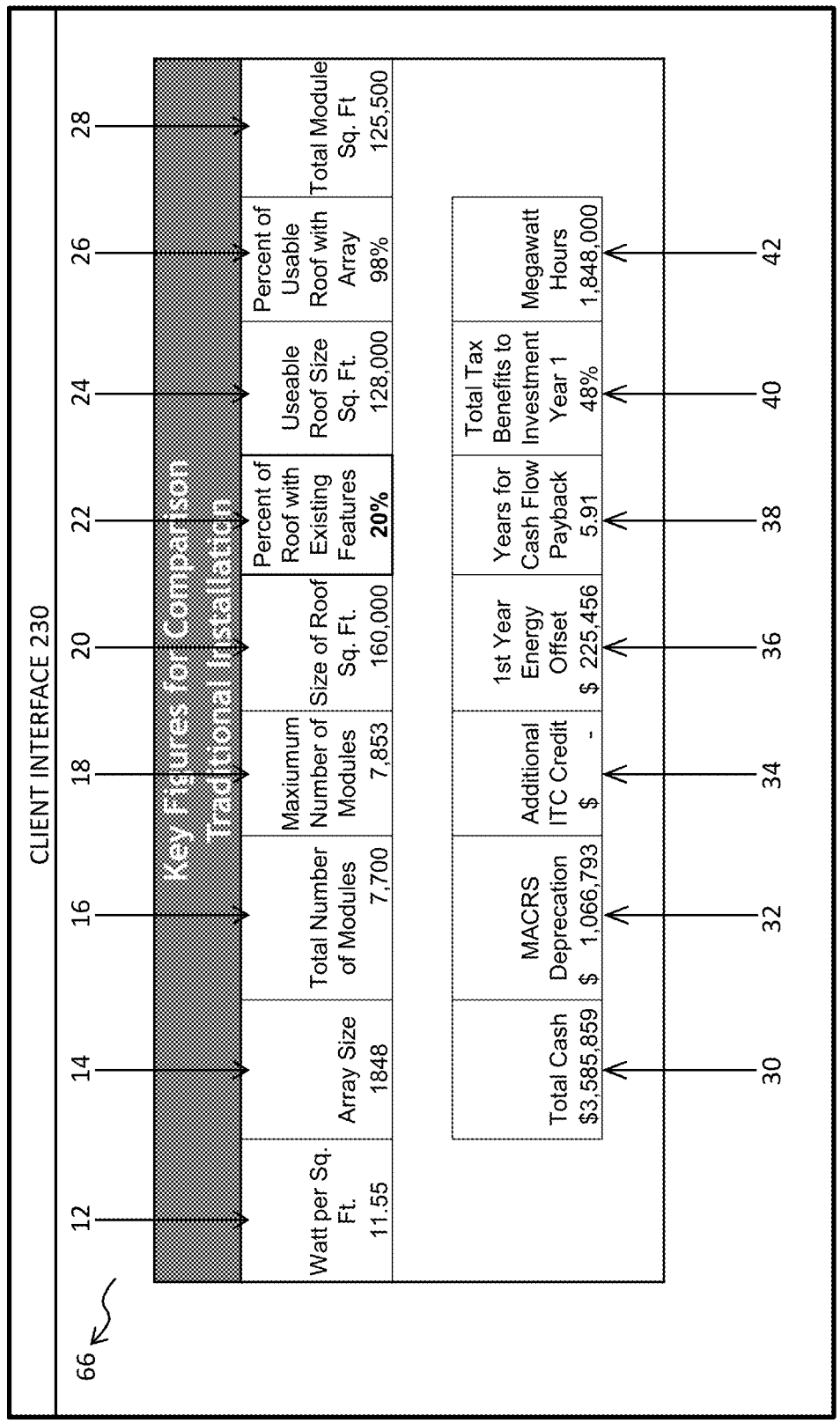

FIG. 4A.—Chart of key figures for effectiveness comparison of a traditional panel installation.

Figure 4B:
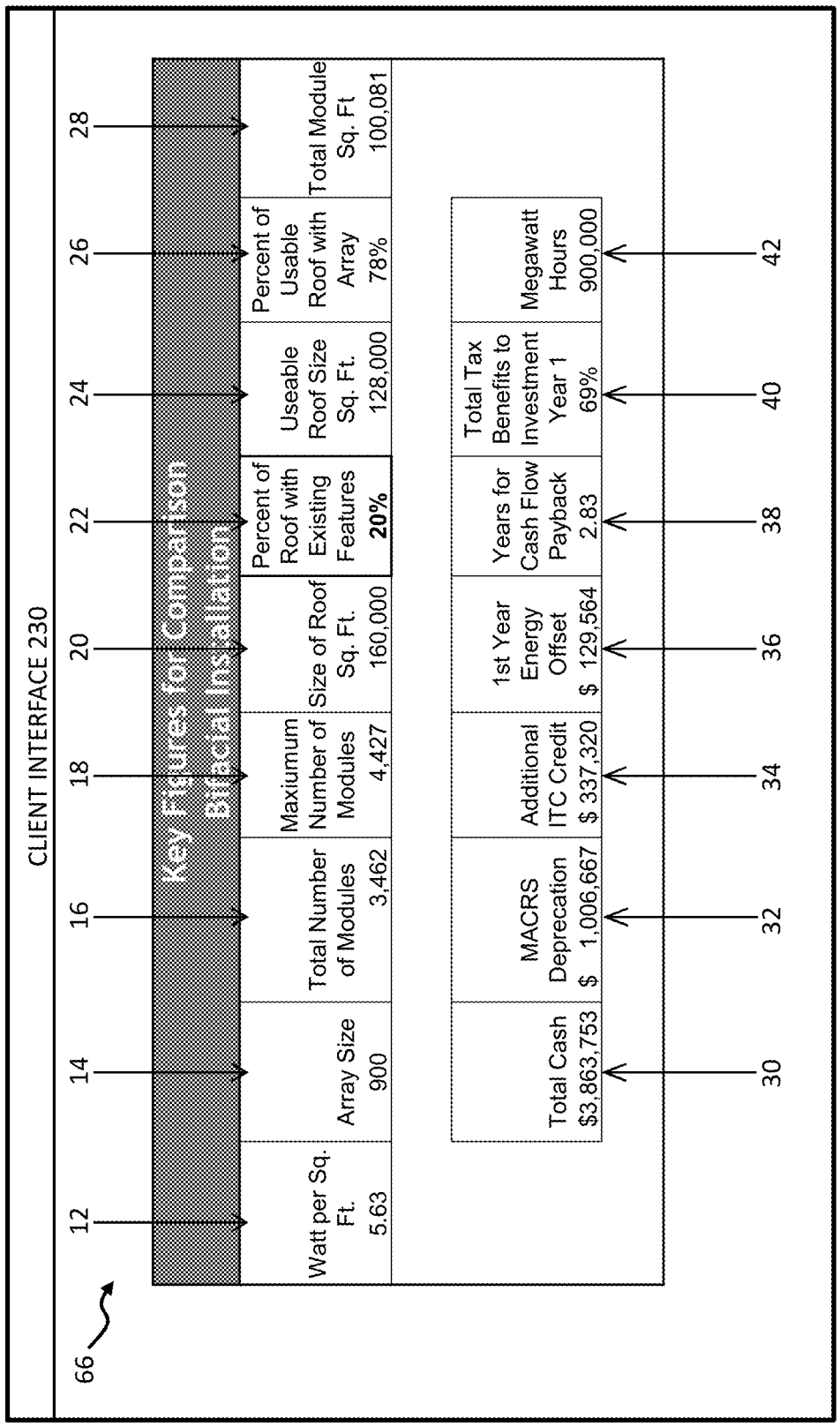

FIG. 4B.—Chart of key figures for effectiveness comparison of a bifacial panel installation.

FIGS. 5A-5D.—Example client interface showing the steps of designing a rooftop LTM installation.

Figure 6:
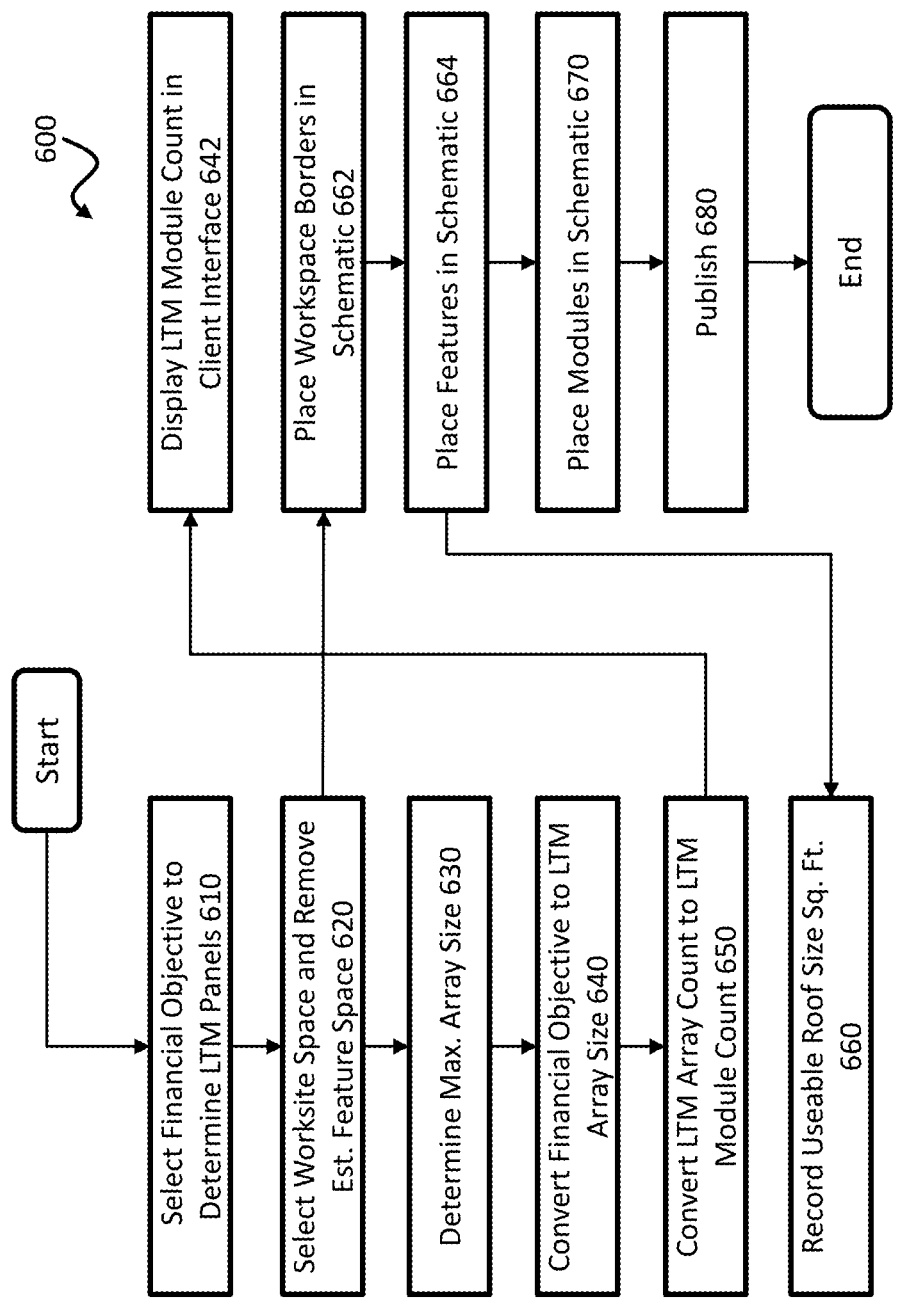

FIG. 6.—Flowchart of creating a solar array schematic.

Figure 7:
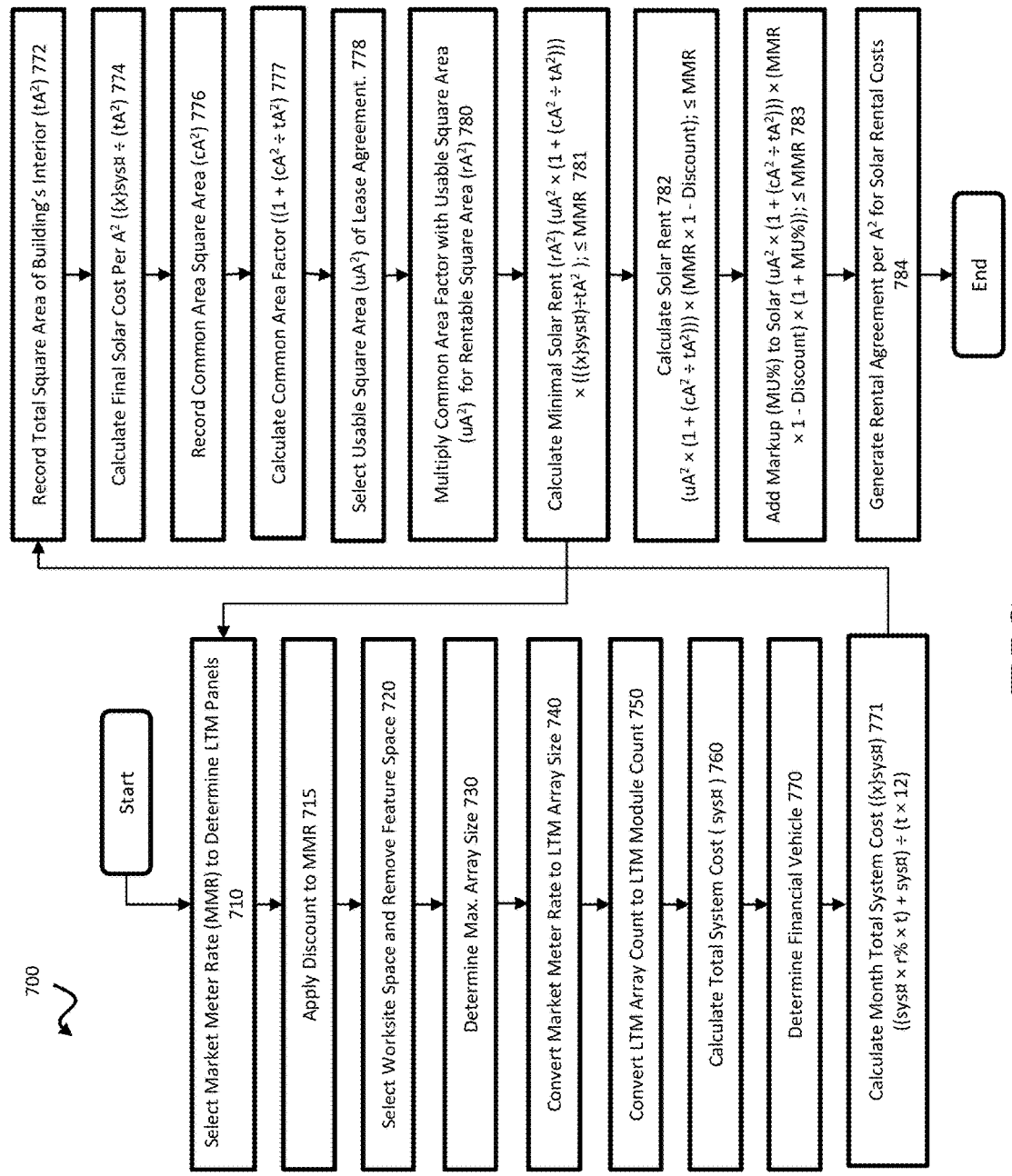

FIG. 7.—Flowchart of the design of a solar power and the conversion of those cost to square Area.

Figure 8:
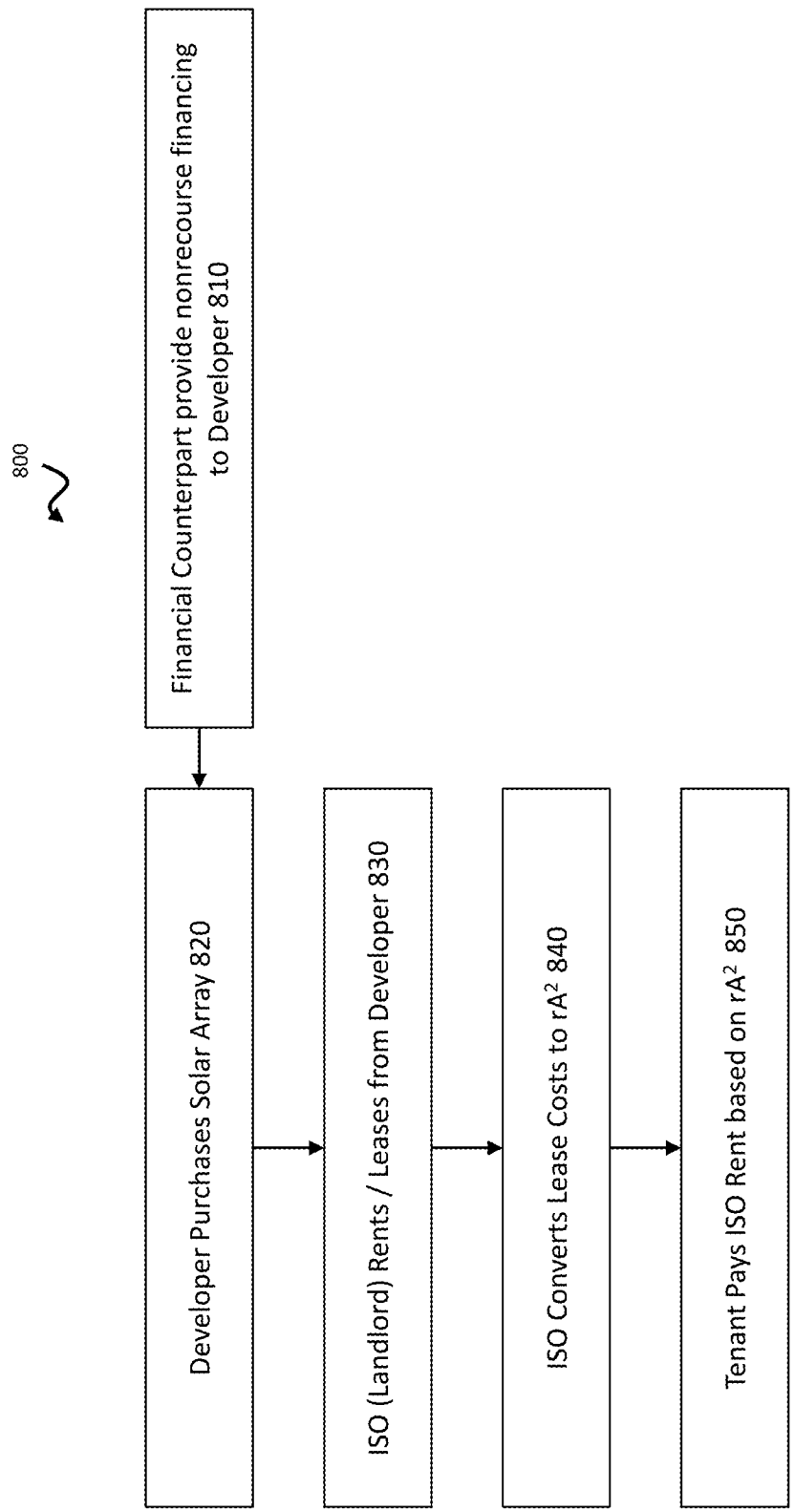

FIG. 8—Flowchart of the cash flow between the financial counterpart, developer, ISO, and tenant.

Figure 9:
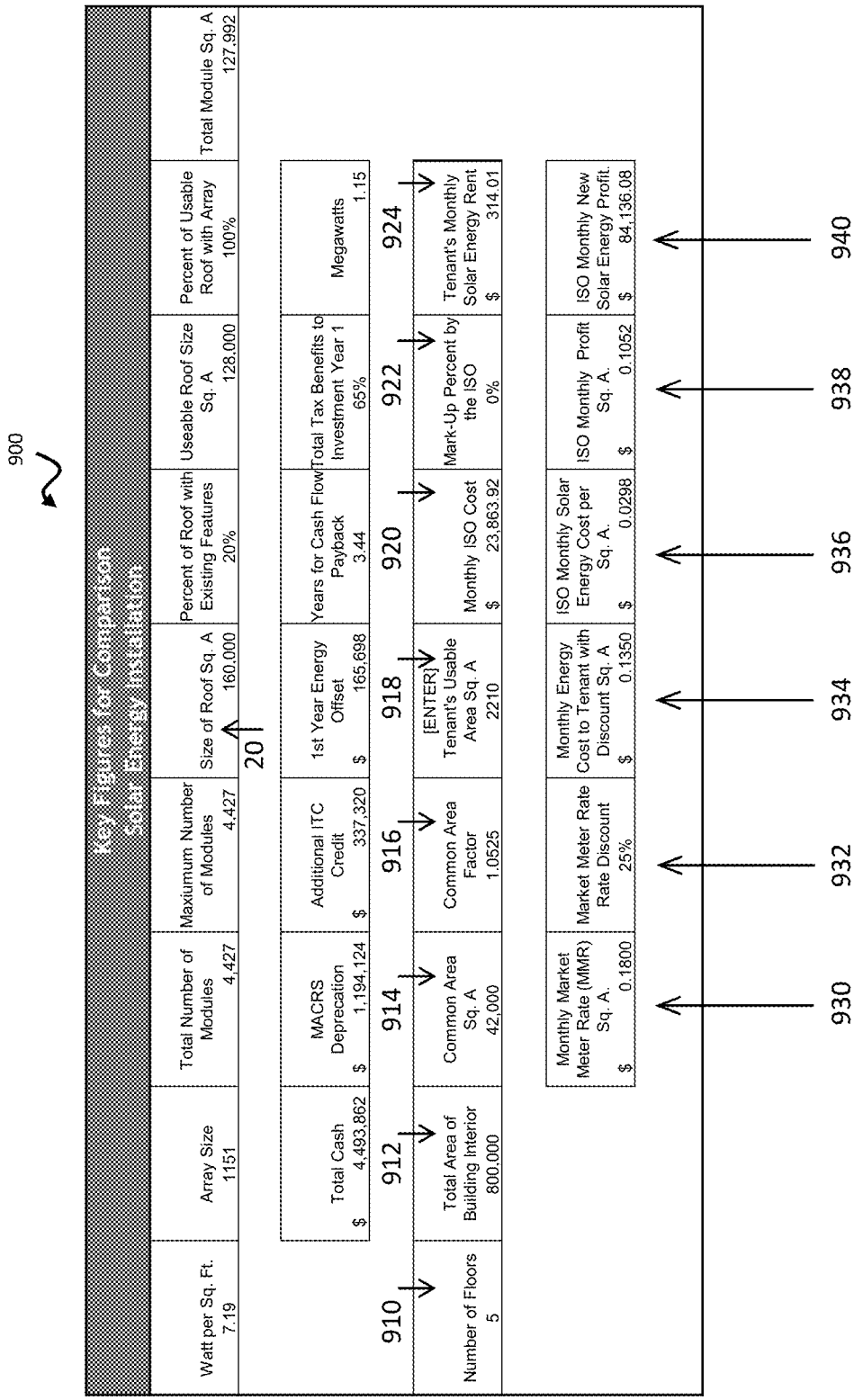

FIG. 9—Chart of key figures for a solar energy installation and the energy costs converted to square Area.

KEY TERMS albedo effect: the surface reflectivity (SR) of sunshine hitting the earth. The second panel of a bifacial panel collects reflected sunlight from the reflective surface of the building's roof.

albedo light: the proportion of the incident light that is reflected by a surface.

Area (A): a geometric measure of space within the interior of a building. There is not a single standard for determining Area and some owners may use space not typically associated with the interior of a building. See square Area.

array: a series of solar panels connected to the same inverter. It is calculated by the Total Kilowatts/Sq. Ft×Sq. Ft. Roof.

azimuth correction factor: a factor used to correct the angle of the first side of a solar panel as the sun moves through the sky. Azimuth is the orientation with respect to True South at 180 degrees.

bifacial: a solar panel with opposing glass faces, on the front and back side of the panel, each designed to generate energy by allowing the collection of both direct and reflected light.

bifacial gain: the percent increase in electricity production of a module by the back side of the module (that side facing a reflective surface).

common area: the space in a commercial building allocated for the use or utilization of all tenants.

common area factor: the percent of space of the total building that is a pro-rata shared expense of multiple tenants. Calculated as $(1+(cA^2 \div tA^2))$. Also referred to variously as the load, core factor, loss factor, pro-rata share, add-on factor, gross-up factor, full-floor factor, partial area factor.

currency (¤): an unspecified currency, also called scarab.

DC to AC size ratio: the ratio of the inverter's size, in maximum AC watts output, to the size of the array, in DC ATC watts. Also known as the array-to-inverter ratio.

DC to AC system loss: the amount of electricity lost when the DC electricity, collected by the modules, is converted into AC electricity.

developer: the party to a solar service agreement who installs, operates, owns and finances a solar system installed on a building owned by the independent service operator (also called the host). The host agrees to purchase the energy output from the developer's solar systems, usually at a discount to market. Also referred to as the seller, as in the party that sells energy to the buyer. Also referred to a solar services provider.

EPC: engineering, procurement and construction. This generally refers to the costs of the three activities but may also refer to the time requirements.

farm: a collection of photovoltaic solar panels. There is no specific size of an installation to qualify as a farm but a peak output of one megawatt of power has been cited as a common standard.

feature: existing or planned constructed item on a roof that would prevent the use of that area for the installation of solar panels. This might include pathways, venting tubes, air conditioning systems, doors, landing pads, skylights, building identifiers, code requirements, etc.

geographic insolation factor: a factor to adjust the insolation measurement by a specific geographic location. See insolation.

host: a property owner that allows a third party to plan, install, finance and operate a solar system on their property.

incident light: light coming directly from the sun before it bounces on a surface. Compare albedo effect.

independent system operator (ISO): for the purposes of this invention, the ISO is the landlord or real estate management company for a specific property, where the ISO converts energy costs to rent per square Area for the solar energy purchased from the developer. Also known as the buyer.

informed schematic: a schematic generated by first linking to, or retrieving, financial objectives in the analytic server or module.

insolation: a measurement of the amount of solar radiation based on the duration and intensity of solar radiation.

inverter: converts the variable direct current (DC) output of a photovoltaic solar panel into a utility frequency alternating current (AC) that can be fed into an electrical network. Also referred to variously as a converter or PV inverter.

kWh/kW DC: calculated as Production divided by Array Size.

Less Than Maximum (LTM): A calculation made by the analytic server to set the ceiling for the number of modules be placed in the schematic where the ceiling is less than the calculated maximum number of modules. See Array.

MACRS depreciation, depreciation: an accounting method where the capitalized cost (basis) of tangible property is recovered over a specified life by annual tax deductions for depreciation.

market meter rate (MMR): the average retail price of electricity to the ultimate customer by end-user sector. This may be historical, census, sample, or contemporary.

maximum density design: a schematic, or method, that provides the highest count of modules the designer can place where the number approached the calculated maximum number of modules.

membrane: a type of roofing material used on flat roofs to prevent leaks and move water off the roof.

megawatt hours (MWh): calculated as kWh/1000. MWh is a common measurement to compare the output production of commercial solar installations.

module: a solar panel. The number of modules may be calculated as Total Watts/Watts per module, or Array Size*1,000/Watt per module.

panel: a solar panel.

photovoltaic (PV) cell: a solar cell, within a module, that converts energy from the sun into electricity.

power purchase agreement (PPA): a solar system finance agreement for a developer (energy seller) to design, install, and maintain a solar installation for little to no cost to the property owner. In exchange, the property owner (energy buyer), agrees to purchase a set amount kWh from the seller. There are many variations on the terms and the party responsibilities for a PPA.

production: the kilowatt hours (kWh) generated by a solar installation in a year. Production is calculated as ((array size/DC to AC Size Ratio)×insolation×AC to DC System Loss X Number of Days in a Year+inverter efficiency)×(1+bifacial gain)).

production degradation: the incremental loss of a module's inefficiency for each year of the module's life.

reflectivity: a measure of the amount of light reflected off a surface, such as a roof.

rentable square Area ($rA^2$): usable square Area ($uA^2$) multiplied times the common area factor. In the US, referred to a rentable square feet (RSF). Compare usable square Area ($uA^2$).

square Area ($A^2$): a two-dimensional geometric measure of Area with all sides being the same length. In imperial units for real estate this is commonly referred to as square foot (or sq. ft., $ft^2$). In metric, real estate refers to the square Area as square meters ($m^2$).

solar service agreement (SSA): a lease or PPA finance agreement by an ISO with a developer to provide solar power at a lower cost per kWh than the local centralized utility.

traditional solar panel: a single-sided solar module that only generates electricity from a single side of the panel.

usable square Area ($uA^2$): the private space available exclusively for the tenant's use. In the US, referred to a usable square feet (USF). Also see rentable square Area ($rA^2$).

watt (W): calculated as KW×1,000.

watts per sq. ft.: calculated as watts/sq. ft. of the roof.

REFERENCE NUMERALS IN DRAWINGS

10 Traditional solar panels
20 Bifacial solar panels
12 Watt per Sq. Ft.
14 Array Size, kWh
16 Number of Modules
18 Maximum Number of Modules
20 Size of Roof Sq. Ft. (user input)
22 Percent of Roof with Existing Features (user input)
24 Usable Roof Size Sq. Ft.
26 Percent of Usable Roof with Array
28 Total Module Sq. Ft
30 Total Cash, Currency
32 Deprecation, Currency
34 Additional ITC Credit, Currency
36 1st Year Energy Offset, Currency
38 Cash Flow Payback, Years
40 Total Tax Benefits to Investment Year 1, Percent
42 Megawatts hours (MWh)
66 Chart of Key Figures for Comparison
70 Developer, seller
72 Independent service operator (ISO), host
74 Tenant
76 Financial counterpart
80 Market meter rate (MMR)
82 Common area factor
100 Flowchart of a networked environment
110 Client devices
130 Servers
140 Data storage
150 Database server
160 Single, cloud server
170 Networks
200 Flowchart of LTM networked environment
210 Browser
230 Client interface
240 Analytics server
250 Design server
300 Computing device
310 Application components
312 System memory
314 Processing unit
316 Operating system
318 Analytic program module
320 Design program module
322 Communication application
324 ROM/RAM
330 Storage
332 Input devices
334 Output devices
336 Communication connection
340 Other devices, foreign devices
500 Worksite
510 Feature
510a Feature, venting fan
510b Feature, HVAC
510c Feature, Access stairwell
610 Select Financial Objective to Determine LTM Panels
620 Select Worksite Space and Remove Estimated Feature Space
630 Determine Max. Array Size
640 Convert Financial Objectives to LTM Array Size
642 Display LTM Module in Client Interface
650 Convert LTM Array Count to LTM Module Count
662 Place Borders in Schematic
664 Place Features in Schematic
670 Place Modules in Schematic
680 Publish schematic
700 System to convert solar energy to commercial property rent
710 Select the market meter rate
715 Apply discount to market rate
720 Select worksite and remove feature space
730 Determine maximum array size
740 Convert market meter rate to determine the LTM array size
750 Convert LTM array count to LTM module count
760 Choose financial vehicle 770 Calculate total system cost
771 Calculate total monthly system cost
772 Record total square Area of building's interior
774 Calculate solar cost per square Area
776 Record area for common space as a measure of square Area
777 Calculate common area factor
778 Select usable square Area of lease agreement
780 Calculate rentable square Area
782 Calculate solar rent per square Area
783 Add a mark-up
784 Generate a lease agreement addendum for the cost per square Area matching the rentable square Area of the lease or rental agreement
800 Business methods cash flow between financial counterpart, developer, ISO and tenant.
810 Financing supplied by the financial counterpart to the developer
820 The purchase of the solar system by the developer
830 The ISO rents or leases energy from the developer
840 The ISO Converts Lease Costs to $rA^2$
850 The tenant Pays ISO Rent based on $rA^2$
910 Number of floor in a building
912 Total Area of a building interior
914 Common area in $A^2$
916 Common area factor
918 Tenant's usable square Area
920 Monthly ISO cost paid to developer
922 Mark-Up by ISO of cost paid to developer
924 Tenant's monthly solar energy rent total
930 Monthly MMR by $A^2$
932 ISO's discount to MMR
934 Monthly energy cost to tenant per $A^2$
936 Monthly energy cost to ISO per $A^2$
938 Profit to the ISO per $A^2$
940 Total monthly profit to the ISO

DETAILED DESCRIPTION OF THE DRAWINGS

Referring to the drawings, in which like numerals represent like elements,

FIG. 1

FIG. 1 depicts a diagram of a networked environment 100, where a system according to embodiments may be implemented. An analytic server 240 and design server 250 may be managed over a communication application 322 over one or more servers 130 or a single server (such as a cloud server 160), such as a hosted service. Modern repository solutions such as content management systems (CMS) allow users to create expansive data and file repositories required for modern CMS systems. These systems provide security modules; real-time design; design project management through task and calendar modules. The communication application 322 may communicate with client interfaces 230 on individual client devices 110 such as a smart phone, a laptop computer, or desktop computer through network(s) 170.

A communication application 322 may direct a layout plan for bifacial solar panels 20 with user-provided configuration information from an analytics server 240. The application may display the content of the analytic server 240 and design server 250 through a unified view with access to the integrated message and document content.

Client devices 110 may enable access to applications executed on remote server(s) 130. The server(s) 130 may retrieve or store relevant data from/to data store(s) 140 directly or through database server 150.

Network(s) 170 may comprise any topology of servers 130, clients, Internet service providers, and communication media. A system 100 according to embodiments may have a dynamic or static topology. Network(s) 170 may include secure networks 170 such as an enterprise network 170, or an unsecure network 170 such as the Internet or a wireless open network 170.

Network(s) 170 may also coordinate communication over other networks such as Public Switched Telephone Network (PSTN) or cellular networks. Furthermore, network(s) 170 may include short range wireless networks such as Bluetooth or similar ones. Network(s) 170 provide communication between the nodes described herein. By way of example, and not limitation, network(s) 170 may include RF, wireless technology such as acoustic, infrared and other wireless media.

Many other configurations of applications, data sources, computing devices 300, and data distribution systems may be employed to manage a bifacial panel 20 plan. Furthermore, the networked 170 environments discussed in FIG. 1 are for illustration purposes only. Embodiments are not limited to the example applications, modules, or processes.

FIG. 2

FIG. 2 shows a diagram 200 illustrating a networked 170 environment, where a communication application 322 may manage analytics, planning and CMS services according to some embodiments. The computing devices 300 and computing environments shown in diagram 200 are for illustration purposes. Embodiments may be implemented in various local, networked, and similar computing environments employing a variety of computing devices 300 and systems.

In an example environment illustrated in diagram 200, a client interface 230 (e.g. a browser 210) executed on client device 110 may display a unified view of analytics and design. The unified view may display services provided on an analytics server 240 and design server 250 through network(s) 170. The server 250 may execute a communication application 322 to retrieve analytics from server 240. The servers 240 and 250 may provide their respective services including analytics and design plans independently of the client device 110 and corresponding client interface 230. In some embodiments, servers 240 and 250 may communicate directly with each other. The integrated content may be displayed to a member having access to the communication application 322 through the unified view. The communication application 322 may also enforce system policies on the integrated content. The application may retrieve data, documents, or images from the design server 250, the analytics server 240, or a third party. The analytic server 240 and the design server 250 may comprise the same storage, processor and memory.

FIG. 3

FIG. 3, and the associated specification, outline a general description of a computing environment in which the present embodiments may be implemented. The illustration is a block diagram of an example computing operating environment for an application, according to embodiments, such as computing device 300. In a basic configuration, the computing device 300 may include system memory 312 and at least one processing unit 314. A computing device 300 may include a plurality of processing units 314 that cooperate.

Depending on the exact configuration and type of computing device 300, the system memory 312 may be volatile (such as RAM 324), non-volatile (such as ROM 324, flash memory, etc.) or some combination of the two. System memory 312 typically includes an operating system 316 suitable for controlling the operation of the platform. The system memory 312 may also include one or more software applications such as analytic program modules 318, design program module 320 and communication application 322.

The design program module 320 may create and manage a schematic, plan, layout, or designs of bifacial solar panels 20 in a physical environment. The analytics program module 318 may provide the data and calculations associated with space, output, costs, revenues, and tax implications.

The communication application 322 may also integrate messages, email associated documents and CMS services. This basic configuration is illustrated in FIG. 3 by the dashed lines surrounding the application components 310.

Computing device 300 may have additional features or functionality. For example, the computing device 300 may also include additional data storage devices 330 (removable and/or non-removable) such as, for example, magnetic disks, optical disks, or tape. Computer readable storage 330 media may include volatile and nonvolatile, removable and nonremovable media implemented in any method or technology for storage of information, such as computer readable instructions, data structures, program modules, or other data.

Computer readable storage 330 media is a non-transitory computer readable memory device. System memory 312, removable storage 330 and non-removable storage 330 are all examples of computer readable storage 330 media. Computer readable storage 330 media may include magnetic cassettes, magnetic tape, magnetic disk storage or other magnetic storage devices, RAM 324, ROM 324, EEPROM, flash memory or other memory technology, CD-ROM, digital versatile disks or other optical storage, or any other medium which may be used to store the desired information, and which may be accessed by computing device 300. Any such computer readable storage media may be part of computing device 300. Computing device 300 may also have input devices 332 such as camera input device, mouse, pen, keyboard, voice input microphone, touch input device, and comparable input devices 332. Output devices 334 such as a voice, printer, display, speakers, and other types of output devices may also be included.

Computing device 300 may additional include communication connections 336 to allow the device 300 to communicate with foreign devices 340. This communication may happen via a wireless network 170 in a distributed computing environment, a receiver/transmitter such as a satellite link, a wireless network, a direct-wired network, a mobile link where the last link is wireless, and other substitutable mechanisms. The other devices 340 associated to the communication connection 336 may include computer devices that execute communication applications 322, storage servers 140, Internet servers 160, application servers, and comparable devices.

Communication connections 336 is one example of communication media. Communication media may include therein computer readable instructions, program modules, or data in a modulated data signal, such as a carrier wave or other transport mechanism, and includes any information delivery media. Modulated data signal is a signal that has at least one of its characteristics set or changed in such a manner as to encode information in the signal. For instance, communication media includes wired media such as a wired network or direct-wired connection, and wireless media such as RF, infrared, acoustic and other wireless media.

Alternate embodiments also include methods. These methods may be implemented in any number of ways, including the methods described in this document. One such way is by machine operations, of devices of the type described in this document. Another embodiment is for one or more of the individual operations of the present methods be performed by one or more human operators performing portions, such as keying project-specific data. These human operators each may be only utilize machine that performs a portion of the program.

FIG. 4A-4B

Turning now to FIGS. 4A-4B is a chart of key figure for comparison 66 comprising a demonstration of the use of the invention to compare a traditional monofacial 10 installation to the bifacial 20 installation.

The user enters the Percent of Roof with Existing Features 22 in the user interface 210 on the client device 110. Existing features 510 are unconstructed and constructed items on the roof, or outdoor surface, that prohibit the placement of solar panels in the space. This may include HVAC units, ventilation systems, access points, and access paths unassociated with the solar installation. Generally, it is estimated that 20% (twenty percent) to 30% (thirty percent) of a roof has existing features.

The Key Figures for Comparison Chart 66, FIGS. 4A-4B, data then pulls from analytics server 240, or data storage 140, through the client interface 230 on the client device 110:

Watt per Sq. Ft. 12
Array Size 14
Total Number of Modules 16
Size of Roof Sq. Ft. 20
Total Cash 30
MACRS Depreciation 32
Additional ITC Credit 34
$1^{st}$ Year Energy Offset 36
Years for Cash Flow Payback 38
Total Tax Benefits to Investment Year 1 40
Megawatt hours 42

The Percent of Roof With Existing Features 22 is then multiplied by Size of Roof Sq. Ft. 20 and subtracted from the Size of Roof Sq. Ft. 20 to determine the Usable Roof Size Sq. Ft. 24 which is the square footage of the roof that may be used for a solar installation.

To determine the Maximum Number of Modules 18 that will fit within the Usable Roof Size Sq. Ft. 24, the footprint of each panel (plus inter-row Sq. Ft.) is divided into the Usable Roof Size Sq. Ft. 24.

To calculate the Total Module Sq. Ft 28 that fit within the Usable Roof Size Sq. Ft. 24, the footprint of each panel (plus inter-row Sq. Ft.) is multiplied by Total Number of Modules 16. Total Module Sq. Ft. 28 is then divided into Usable Roof Size Sq. Ft. 24 to produce Percent of Usable Roof with Array 26.

FIG. 4A is an analysis of an existing warehouse roof 'Traditional Installation' with approximately 7700 (seven thousand seven hundred) panels on a 160,000 (one hundred and sixty thousand) square foot roof producing 1.8 (one point eight) megawatts hours (MWh) 42 representing a 90% (ninety percent) offset of the building's annual energy costs of approximately $250,000 (two hundred and fifty thousand dollars). Assuming Percent Roof with Existing Features 22 is 20% (twenty percent), at 7700 (seven thousand seven hundred) Total Number of Modules 16, accounts for 98% (ninety-eight percent) of the Usable Roof Size Sq. Ft 24. This maximized installation meets the design objectives for monofacial panels because it allows the manufacturer to scale large projects, the seller to maximize commission, the planners to maximize fees, installers to maximize labor costs, and the seller to internally sell the maximum possible energy offset. However, the Years for Cash Flow Payback 38 is 5.91 (five point ninety-one) years with the Total Tax Benefits to Investment Year 1 40 is only 48 (forty-eight) percent.

FIG. 4B is chart of key figure for comparison 66 comprising comparative analysis of the same building with a 'Bifacial Installation.' Both installations have a Total Cash 30 of approximate $3.5M (three point five million dollars). Due to the higher costs of a bifacial 20 installation, the bifacial has only 40 (forty) percent of Total Number of Modules 16 as the monofacial installation in FIG. 4A. With a conservative 18% (eighteen percent) of Bi-Facial Gain, the Megawatt hours 42 for the bifacial 20 installation is 44% of the monofacial installation. Despite, relatively similar Total Cash 30 outlay for the two installations, the Years for Cash Flow Payback 38 for the bifacial 20 installation is half of that of the traditional 10 installation. For the bifacial 20 installation, Total Tax Benefits to Investment Year 1 40 is 72% (seventy-two percent) versus only 48% (forty-eight percent) for the traditional 10 installation in FIG. 4A.

FIG. 5A-5B

FIGS. 5A-5D present the general steps of planning a bifacial solar panel 20 schematic based on the prepared financial data (detailed in the associated provisional application) that may be stored on data storage 140 device. The described methods may be performed in any order, simultaneously or alternately.

FIG. 5A

Figure 5A:
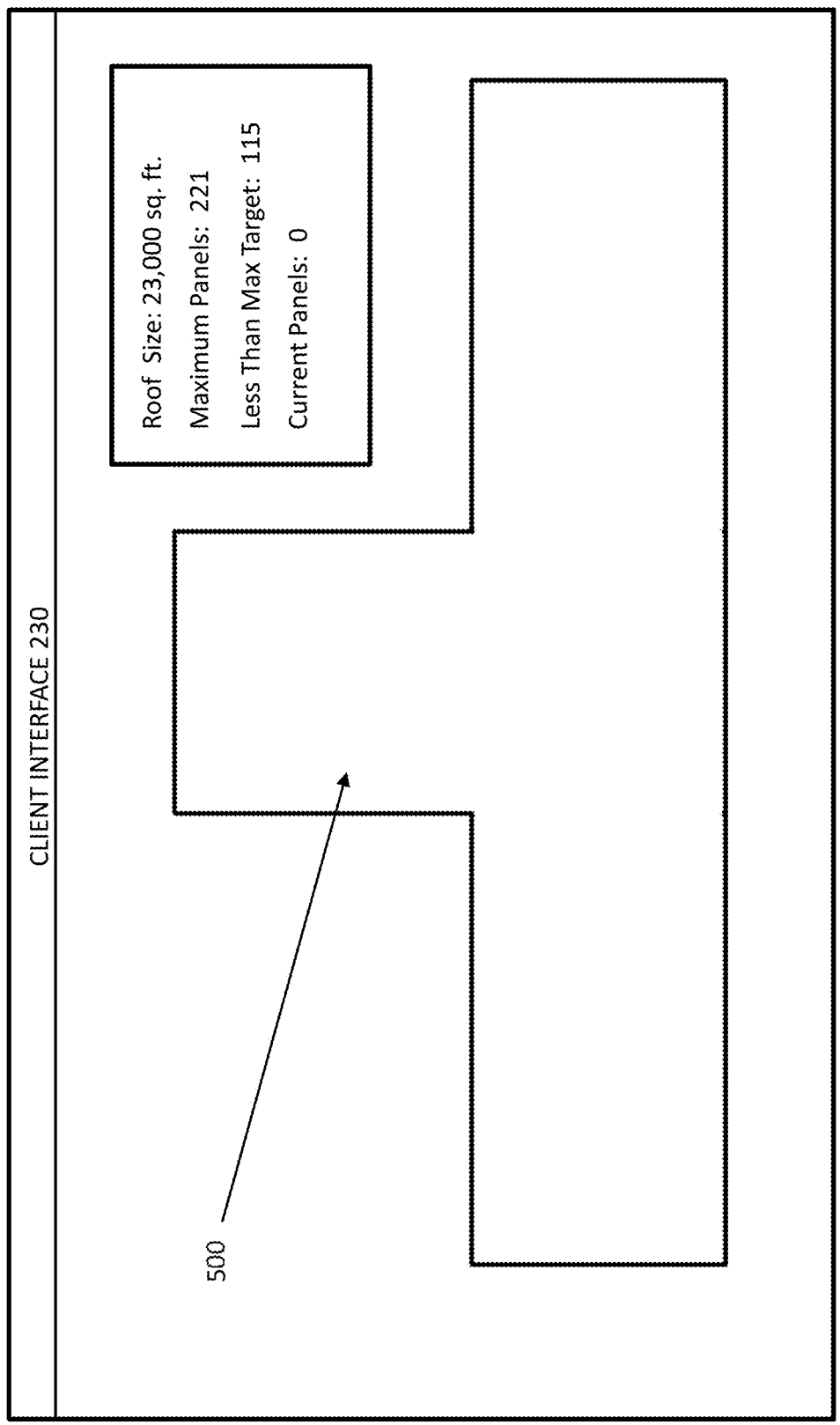

FIG. 5A is the representation of a client interface 230 in the first step of preparing a schematic of a bifacial 20 solar installation. The polyline 'T' shape represents an example roof worksite 500. However, due to the endless design possibilities the image may be composed of circles, curves, arcs, triangles, polygons, lines, etc.

The worksite 500 may be created using any number of methods including scanning an overhead image, importing a *.DWG AutoCAD file, entering coordinates of the boundaries, or manually drawing the space on the client interface 230. Due to the dependence of the panel on the orientation to the sun, the directional placement may be added. In the present invention, the size of the space is known and provided by the analytics server 240 to the client interface 230.

In the prior art, the polyline shape would be unbound from the financial and output objectives of the project. However, because the present method is tied to the predetermined financial less than maximum (LTM) data, the system not only knows the boundaries of the schematic but is informed and able to show the calculated design criteria for the project. In the box of the upper right-hand corner of the client interface, the maximum number of panels is projected by the analytics server 240 by estimating the percent of roof with existing features 22 to calculate the useable roof size 24 which is then divided by the space requirements of each panel. The space requirement of each panel may be calculated using the height of the panel; width of the panel; linear space between panels; tilt; minimum space between the front of one panel and back of the facing panel; racking; etc. However, because the objective is not to design a maximum output design, the system may use another financial objective such as total cash 30, depreciation 32, years for cash flow payback 44, total tax benefits to investment year 1 40, etc. The maximum energy offset can be measured in kilowatt hours, such as megawatt hours 42, or in currency, such as $1^{st}$ year energy offset 36. The informed data may be encoded in the metadata of the design, may be pre-existing encoded data in the file, may be stored on the data storage 140 device, or may be independently presented to the client interface 230 by the analytics server 240.

In the example, the roof size 20 was presented by the analytic server 240 as 23,000 (twenty-three thousand) sq. ft. The example server 240 also provided the client interface 230 with maximum number of panels 18 as 221 (two hundred and twenty-one), the LTM Target of 115 (one hundred and fifteen). The example design server 250 is showing the current bifacial solar panel 20 count of 0 (zero). The LTM Target becomes a ceiling that may mark any panels added over 115 (one hundred and fifteen) as illegal or may prevent the addition of more panels once the target is reached.

In the prior art, the outline would be created in client interface 230 and then be keyed with properties associated with the site such contact information, drawing scale, location data, utility information, roof load limits, etc. However, that data would still be uninformed of the financial objectives because the information would not be available until after the finalization of the design. As specified in 5D, the final design in the prior art becomes dependent on the designer to maximize the output of the design by manually planning around the inherent limitation of any space. Once all the limitations are overcome, and finalized, the resulting financial implications are known.

FIGS. 5B-5C

Figure 5B:
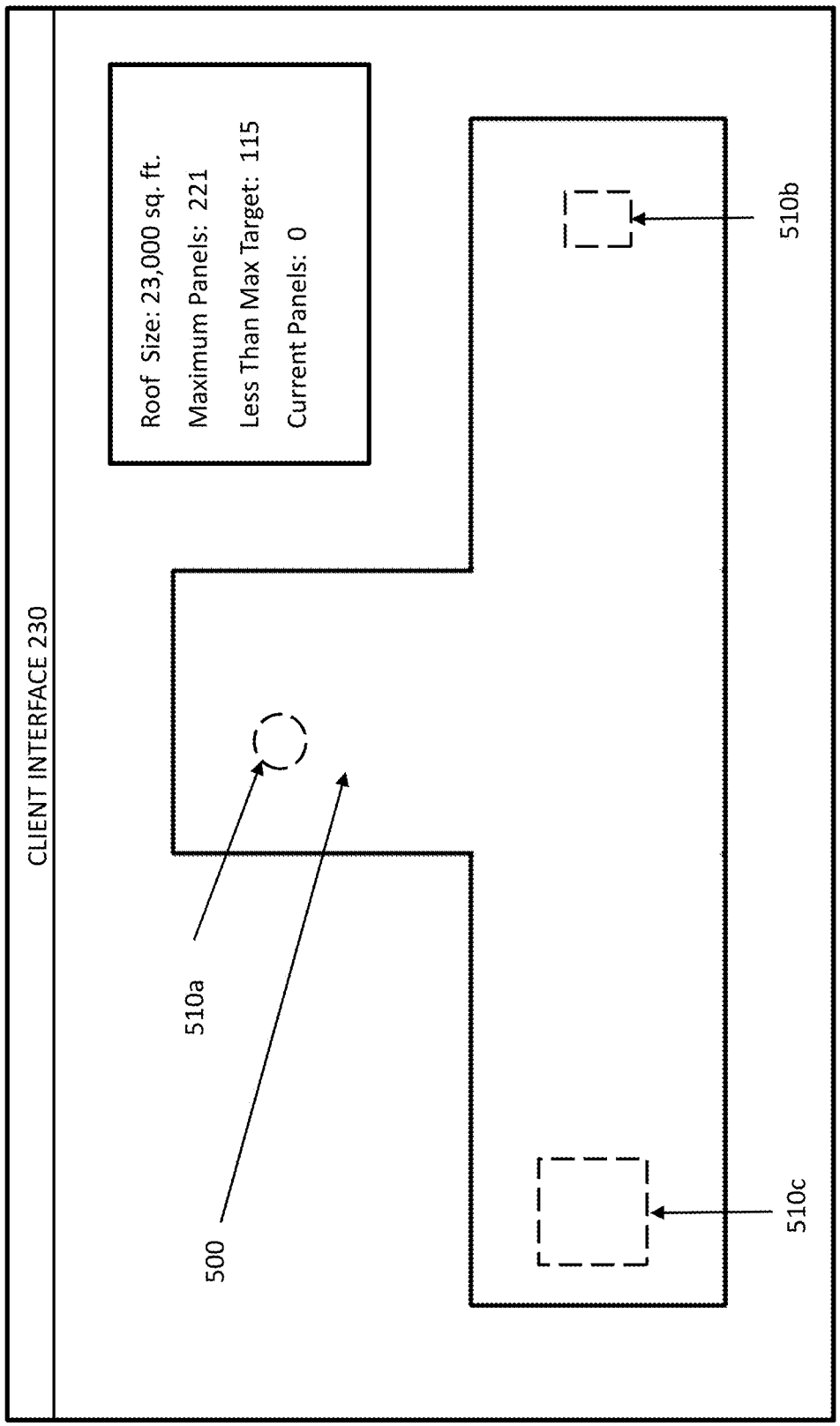
Figure 5C:
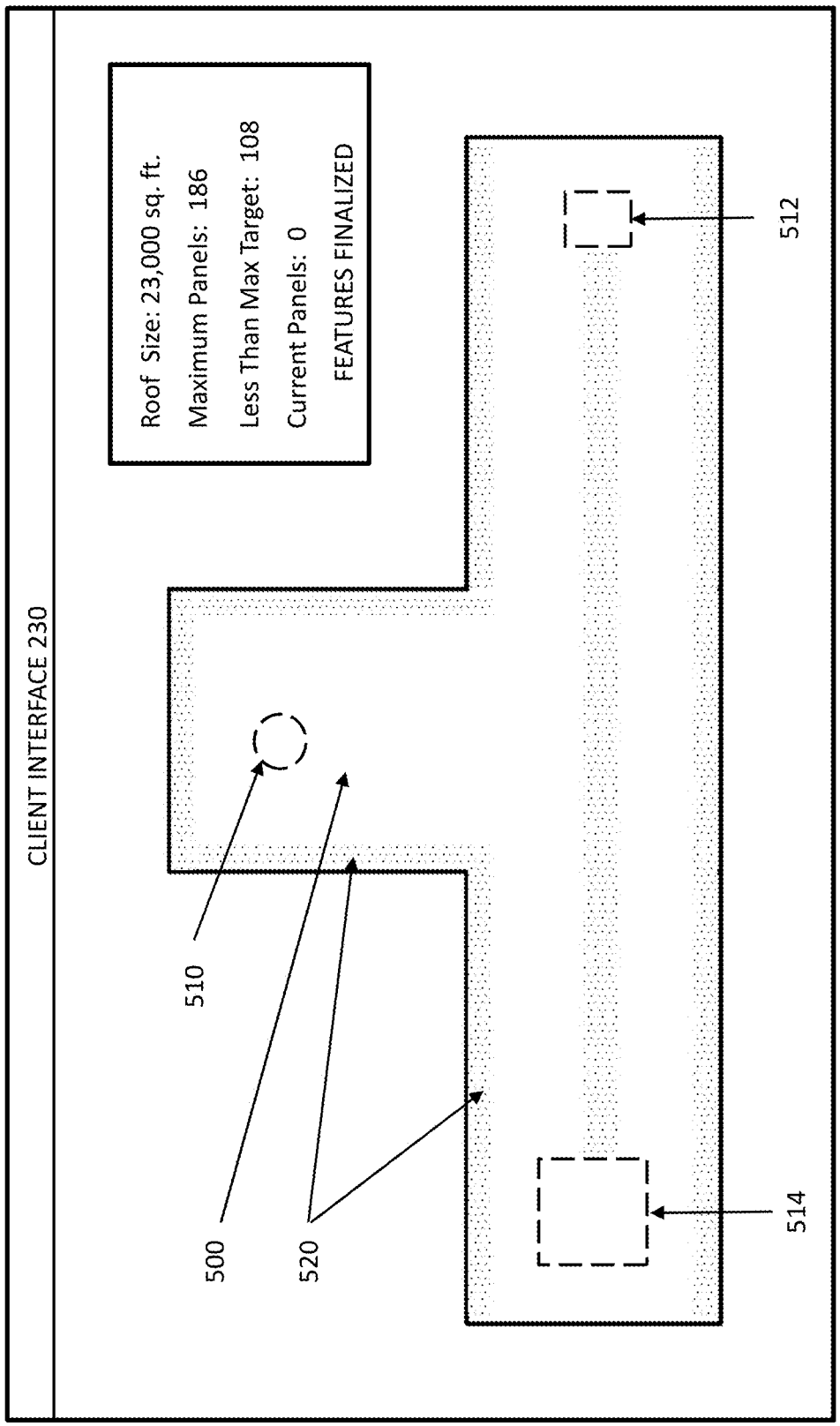
Figure 5D:
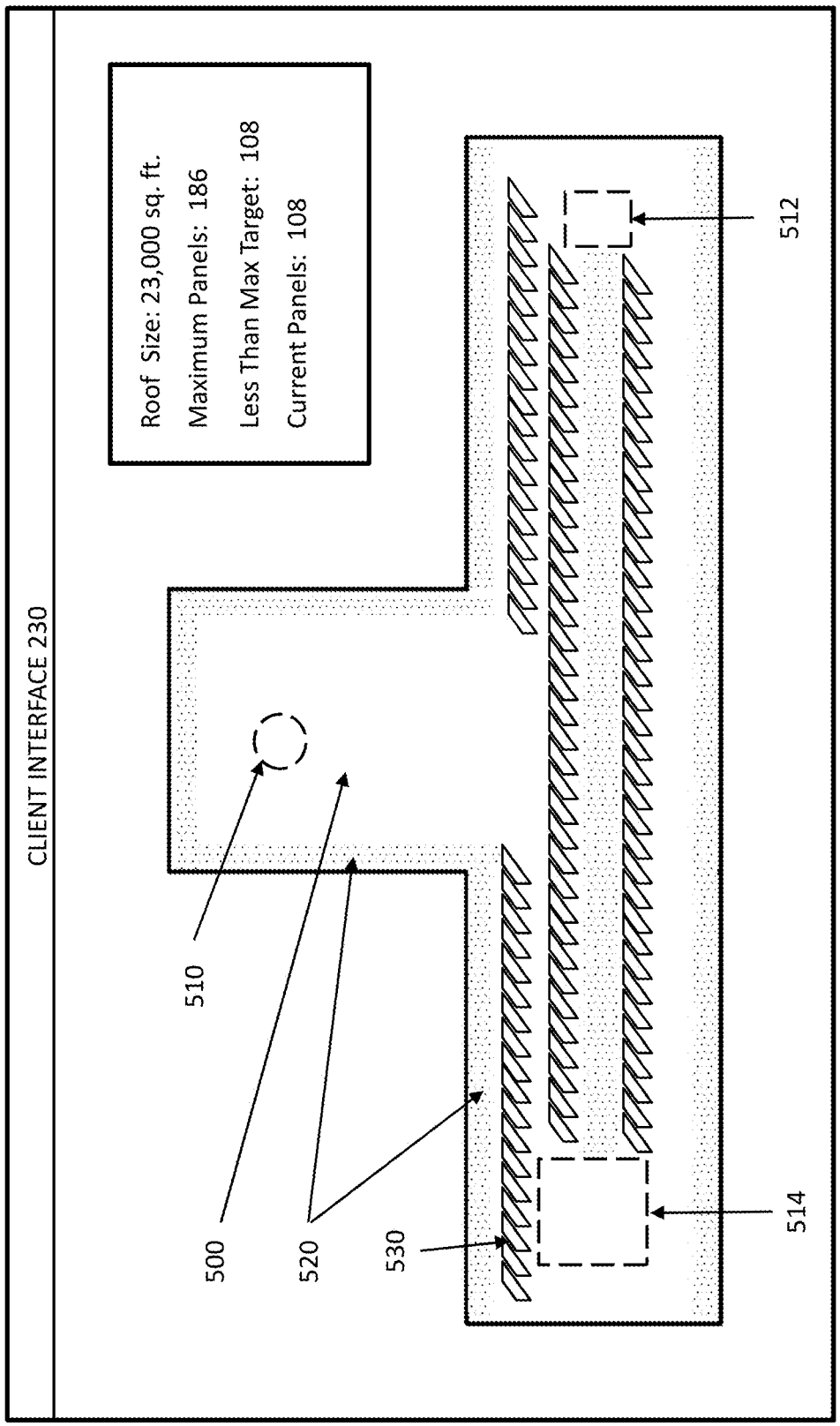

FIGS. 5B-5C add features 510 to the schematic on the client interface 230 to calculate the actual useable roof size 24. In the analytic server 240, the percent of roof with existing features 22 may be estimated by scanning an aerial image, importing a CAD file, or with a guestimate from the designer.

There are two types of features 510 present in a schematic: solid and linear 520. In the FIG. 5B, the designer, using the client interface linked to the design server 250, has placed three solid features 510 on the worksite 500: a venting fan 510a, a HVAC unit 510b, and an access stairwell 510c. The percent of roof with existing features 22, to calculate the useable roof size 24, is still estimated because the linear features 520 are yet undefined. In an alternate embodiment, the percent of roof with existing features 22 estimate may be informed by each addition of a new feature 510 resulting in a statistical adjustment to the estimate by passing the feature 510 data from the design server 250 to the analytic server 240 and then retrieving the new projection from the analytic server 240 and passing it to the client interface 230. In the example, the addition of feature 510 leaves the maximum panels 18 and LTM target as the same as the FIG. 5A because the percent 22 estimate is maintained.

Solid features 510 may include walls, exhaust systems, HVAC systems, pipes, conduits, skylights, window cleaning equipment, stairwells, railing, elevator equipment, drains, antennas, signage, satellites, etc.

In FIG. 5C, the linear features 520 are added to the schematic on the client interface 230, shown as dotted lines in this example illustrations, and the schematic features 510 are fully represented.

These linear features 520 establish boundaries and may include spaces for utility right of way, zoning right of way, setbacks, solar panel access requirements, shadows, helipad space, exteriors of access space, flood plains, environmentally restricted areas, etc.

Once finalized, the square feet occupied by the features 510 may be passed from the design server 250 to the analytic server 240 to calculate the actual percent of roof with existing features 22; new unprojected maximum panels 18; new unprojected LTM target; and other financial and spatial data. Then the client interface 230 may retrieve the new unprojected maximum panels 18 and LTM target. In the example in 5C, the maximum panels 18 are reduced by the analytic server 240 to 186 (one-hundred and eighty-six) maximum panels and the LTM target, or ceiling, is reduced to 108 (one hundred and eight). Since no panels have been placed in the schematic, the current panels still show 0 (zero).

Now that the LTM target is finalized based on the established financial objectives and the useable foot size sq. ft 24, the designer may lay panels into the schematic by using the client interface 230.

FIG. 5D

In the 5D example the designer has added 108 (one hundred and eight) bifacial solar panels 20 to match the analytics server's 240 ceiling of 108 (one hundred and eight) panels 20.

In the prior art, the tactics of the designer to create the schematic involves trying to maximize the space used in the boundaries provided. This involves selecting the most suitable bifacial 20 model, adding the features 510, placing the modules 530 on the worksite 500 schematic, estimating the projection outputs, recalculating return, and adjusting the number and layout of the modules 530, selecting and alternate bifacial 20 model, etc. As the number of modules 16 grows, these co-dependent operations continually change the design requirements, identify illegal parameters, and adjust the resulting power outputs. Even adding a new module 530, may impact the entire design including adding new linear features 520 and new supporting electronics. The trial-and-error complexity of these designs makes the process a form of dynamic art that creates decisions, and a final design, that is as qualitative as it is quantitative. This complexity means a single design may often take months of planning. This requires large system resources for storing, processing and communicating traditional 10 design.

By beginning the design with an LTM target, in the present invention, associated with analytics parameters, the number of panels may be automatically placed on the schematic to exactly reach the analytic parameters. This reduces total planning time which improves total system performance and reduces systems requirements. However, it should be understood that an LTM design is not a less expensive installation design. While LTM implies less modules 530, the EPC costs may be substantially more expensive than for a traditional 10 installation.

FIG. 6

FIG. 6 is a logic flow chart for the overall process of generating a schematic using the less than maximum system method according to the embodiments. Process 600 may be implemented by an analytics, financial planning, or design application in some examples.

Process 600 begins with operation 610 of selecting a financial objective, stored on the analytics system 240, to determine the LTM number of panels to be installed. This financial objective is often quantified by the clients as return on investment, years for cash flow payback 38, total tax benefits year 1 40, etc. At operation 620 on the analytics server 240, the worksite 500 space square footage is selected, or keyed, or calculated; then, the system estimates the total amount of worksite 500 square footage with features 510 (generally estimated between 20 (twenty) and 30 (thirty) percent). During operation 630, using the estimation from operation 620, the maximum array size 14 is calculated on the analytics server 240. The maximum array financially unbound size is calculated by the Total Kilowatts/Sq. Ft×Sq. Ft. Roof or Total Kilowatts/Usable Roof Sq. Ft. The next operation, 640, is to calculate, on the analytics server 240, the array size 14 limited by the financial objective. As an example, and not a limitation, if the building's owners wish to have a Years for Cash Flow Payback of 2.83 years, as in FIG. 4B example, then the array size 14 would be reduced to meet that financial objective. However, while the LTM array size 14 would be reduced from the maximum array size 14, the EPC costs would be anticipated to be higher than a traditional 10 schematic. At operation 650, the array is converted, on the analytics server 240, to the number of modules 16 as Array Size 1,000/Watt per module.

During operation 642, at the client interface 230, the LTM Module Count is displayed. This count may also be used by the design program module 320 to set a limitation on the number of modules 16 allowed on the schematic. This ceiling may prevent adding any modules 530 that would exceed that count or simply mark the modules 530 as illegal. At operation 662 at the client interface 230, the borders for the worksite 500 are created, or placed, in the schematic. The worksite 500 borders may be created using any number of methods including scanning an overhead image, importing a *.DWG AutoCAD file, entering coordinates of the boundaries, or manually drawing the space on the client interface 230. The scan or import may be done by a program module at the client interface 230 but stored on the design and/or analytics servers 250,240. At operation 660, the analytics server 240 stores the actual usable roof size 24 now that the actual feature 510 square foot is known. During operation 662, using the client interface 230, the planner places the workspace borders in the schematic. The next operation, 664, at the client interface 230, the user marks the location and size of solid and linear features 520. At operation 670, the user, at the client interface 230, locates modules 530 on the schematic. The modules 530 may be automatically generated and located; or manually selected and positioned; or a combination thereof. Once finalized, as a last operation 680 on the client interface 230, the schematics may be saved for publication, such as communication or display.

FIG. 7

FIG. 7 is showing a logic flow chart for the overall process of generating a solar cost per square Area using the less than maximum system method according to embodiments. Business methods 700 may be partially implemented by analytics tools, design applications, or contract processing applications.

Business methods 700 begins with the business process 710 of selecting the market meter rate (MMR) 80 defined as the retail average market rate for electricity to the ultimate customer for that customer's sector. The customer would be an independent system operator (ISO) 72, defined as the landlord or real estate management company for a real estate property where the independent system operator 72 resells the solar energy purchased from an energy seller 70 to tenants 74 in their 72 building. This MMR 80 may be selected from published historical rates, such as from US Department of Energy, antidotal sources such as industry blogs, syndicated data sellers, consultants, local surveys, internet searches, or even with an estimate. The market meter rate 80 is entered into the analytics system 240, to determine the LTM number of panels to be installed. The market meter rate 80 would typically be collected and entered as kWh 14.

At business method decision 715, the independent system operator 72 may determine a discount from the MMR 80 that would be attractive to potential tenants 74 for energy cost.

This discounted rate may be equal to, or more than, the charge per kWh 14 paid by the ISO 72 to the solar system's owner 70, referred to as the developer 70 for the purposes of this invention. The developer 70 would already be offering the ISO 72 an energy rate discounted from market rate because this is the primary benefit of these arrangements. So, if the ISO 72 offers the same discount rate to their tenant 74, it would be a significant discount to MMR 80. The ISO 72 could also add a profit to the developer 70 discount rate and still offer the tenant 74 a discount to MMR 80. Further discussion of this can be found in FIG. 9.

At operation 720, the worksite 500 space square footage is selected, or keyed, or calculated; then, the system estimates the total amount of worksite 500 square footage with features 510 (generally estimated between 20 (twenty) and 30 (thirty) percent). During operation 730, using the estimation from operation 720, the maximum array size 14 is calculated. The maximum array financially unbound size is calculated by the Total Kilowatts/Sq. Ft×Sq. Ft. Roof or Total Kilowatts/Usable Roof Sq. Ft. The next operation, 740, is to calculate the array size 14 limited by a metric less than or equal market meter rate 80.

At operation 750, the array is converted to the number of modules 16 as Array Size*1,000/Watt per module. Once we have the number of modules, we may calculate the total system costs (sys ¤) 760 by adding the cost for the:

Number of panels
Number of inverters
Number of batteries
Number of surge protectors
Number of trackers
Meter
Computer/Instrumentation
Wireless transmitter
Number of lightning arrestors
Service box
Solar combiner box
Feet of wiring
Feet of roof flashing and adhesive
New roof membrane
Installation labor
Engineering and design The next step is to identify an appropriate financial vehicle 770 to maximize the developer's 70 maximum return on investment and provide the lowest energy cost to the ISO 72. There are many options including PPAs, SSAs finance lease, true leases, leveraged lease, structured operating lease, capital lease, single investor lease, system integrator lease, etc. Each agreement type will offer different costs per kWh 14 to the ISO 72 and different asset costs to the developer 70. The developer 70 may offer only a single financing agreement type since the seller 70 may have a single source for a finance counterparty 76 for non-recourse financing. If so, the calculation of the monthly total system costs ({x}sys ¤) 771 for the ISO 72 is relatively straight forward because there are no other options to analyze. The simple interest calculation is the total system costs (sys ¤) times the interest rate per year (r&) and times the years (t) of the obligation, typically 15, divided by the months of the obligation, so monthly total system costs ({x}sys ¤) 871 would be:

$$(\{x\}sys^¤) = (((sys^¤ \times r \% \times t) + sys^¤) + sys^¤) \div (t \times 12)$$

Steps 710 to 771 may be performed by the with the developer 70 or ISO 72, or by both. If the developer 70 calculates the monthly total system cost ({x}sys ¤) 771, the developer 70 may then add a profit margin to the final cost, calculate total kWh 14 production and prepare the financial agreement to present to the ISO 72.

The remaining steps of the FIG. 7, steps 772 through 784 take the monthly total system costs ({x}sys ¤) and convert that figure to the tenant's 74 solar energy rent per A².

In step 772 of FIG. 7, the ISO 72 records the total square Area of the host building's interior (tA²) 772 or provides the information to the developer 70 for their further calculations. There are no standards for determining a building's interior (tA²) and the calculations may vary from building to building. To determine a building's interior (tA²), some owners may remove internal components such as support structures; others may count the total space from interior window to interior window; others may count the perimeter of the furthest outside walls; and still others may count from furthest outside ornamentation (gargoyle to gargoyle) as a building's interior. The process is opaque to the tenant 74 but is of consequence to the developer 70 to determine total production and array size 14. If the ISO 72 is exaggerating interior space (tA²), total system cost (sys ¤) will increase and result in over production. This results in higher costs to the ISO 72 and tenant 74.

Once we have determined a pragmatic measure of a building's interior (tA²), we can then calculate the total cost per square Area (A²) 774 by taking the total system costs (sys ¤), from step 760, and dividing by the building's interior square are (tA²) as:

$$¤_{A^2} = (sys^¤ \div tA^2)$$

This figure (¤ A²), from step 774, provides a meaningful basis for the ISO 72 to determine a comparable cost basis per A² as a comparison to other capital improvements costs, both past and those under consideration. For instance, the landlord of a 600,000 tA² may be considering two options to attract new tenants and keep current tenants:

1. Providing solar to reduce the tenant's energy costs and meet their corporate responsibility initiatives at a total cost of $2,962,148;
2. Provide updates to 10,000 A² common area restrooms at a finish-out cost of $880,000.

The monthly lease payments on the solar power system, from the seller 70 to the buyer 72, is treated as an unamortized lease under 'General and Administration' costs at $26,725 per month, or $0.24 A² per year and in the US qualifies under financial accounting standard FASB 13 ($2,962,148÷600,000÷15).

The capital improvement in the common area is treated as building owner's 72 capital improvement for a total cost of $5.87 A² per year ($880,000÷10,000÷15).

Although the total cost of updating the common spaces is 70% less than installing a solar power system, the cost per A² is 96% higher than a solar system.

In step 776 of this logic flow chart, the landlord 72 must evaluate and record the A² of the internal common area. Common area may include lobbies, restrooms, hallways, janitorial areas, cafeterias, elevators, escalators, skyways, and vertical penetrations. However, like measures of the interior space of the building, landlords 72 may use a customized formula for calculating the area to be allocated as common space in a particular building. The building has two distinct spaces: common space (cA²) and usable space (uA²). The uA² is the private space exclusively used by a tenant 74. When the entire building's cA² and uA² are added together the resulting figure should equal the tA².

$$tA^2 = cA^2 + uA^2$$

Now that that the $cA^2$ and $tA^2$ are known at this stage of the chart, the next step 777 is to determine a factor based on those figures, known as the common area factor 82. The common area factor 82 is a ratio of $cA^2$ over the $tA^2$ and calculated as:

Common area factor=1+($cA^2 \div tA^2$)

The common area is a pro-rata share of space available to multiple tenants 74. The common area factor 82 is used in step 780 to determine how much of the $tA^2$ the tenant 74 will be responsible for in both the occupancy $A^2$ lease rate and the energy $A^2$ lease rate. The energy $A^2$ lease rate is not tied to the actual kWh 14 energy use by the tenant 74.

In step 778, we measure and record the usable square Area ($uA^2$). The $uA^2$ is the area available for the tenant's 74 private use. The user then multiples this $uA^2$ by the common area factor 82 to determine the rentable square Area ($rA^2$) in step 780. This resulting $rA^2$ is used for both the occupancy rent and the solar energy rent of the rent agreement (s).

$rA^2 = uA^2 \times$ common area factor

In step 781, we take the step of calculating the ISO cost of solar rent per $A^2$. With this figure we can now determine the minimum charge to the tenant 74 based on $rA^2$ instead of the standard cost per kWh 14 used by commercial power providers. The method to do this is to multiply the usable area times the common area factor 82 and then multiply that by the system cost per $A^2$ per month where it is less than or equal the MMR so that minimum monthly solar rent $A^2$ is calculated as:

$(uA^2 \times (1+(cA^2 \div tA^2))) \times ((\{x\}sys^{\maltese})\div tA^2); \leq MMR$ The minimum monthly solar rent $A^2$ allows the ISO 72 to analyze profits and margins between the system cost per $A^2$ and tenant's rent per $A^2$. It also allows the ISO 72 to determine total profits in a calendar period as further discussed in FIG. 9.

To calculate the tenant's rent per $A^2$ 782, we take the rentable square feet $rA^2$ and multiple this by discounted MMR from steps 710 and 715.

$(uA^2 \times (1+(cA^2 \div tA^2))) \times (MMR \times 1-Discount); \leq MMR$

In step 783, we have the optional task of adding a mark-up to the rental cost per $A^2$ to the tenant 74 by the ISO 72. The mark-up may be for smaller tenants 74 or to account for occupancy rates. In other embodiments, the mark-up is not used, and this step is not included in the process. To add the mark-up step 782:

$(uA^2 \times (1+(cA^2 \div tA^2))) \times (MMR \times Discount); \leq MMR$

In another embodiment, the user may determine the tenant's 74 rent as a mark-up of monthly system costs paid to the ISO.

$(uA^2 \times (1+(cA^2 \div tA^2))) \times ((\{x\}sys^{\maltese})\div tA^2) \times (1+MU\%));$
$\leq MMR$ Finally, the last step of FIG. 7 is to generate a rental or lease agreement by $rA^2$ for solar energy 784. This may be a component of the occupancy $A^2$ rental rate or may be a separate $A^2$ cost in the lease agreement. In another embodiment, the charge per $A^2$ may be in a separate addendum. The tenant 74 may now be charged for energy by the rentable square Area as part of rental agreement; a rate which is not tethered to actual usage of energy by the tenant 74.

FIG. 8

FIG. 8 is a logic flow chart showing the business methods for the movement of payments between key players such as the financial counterpart 76 to the developer 70, the developer 70, the ISO 72 and the tenant 74. Business process 800 may start with a developer 70 obtaining nonrecourse financing from financial counterpart 810. The financial counterpart 76 may be a banking institution or a company that specifically lends to develop solar energy projects. Once, the financial counterpart 76 has agreed to finance a project, or projects, for the developer 70, the developer 70 may approach commercial building owners, or managers, with the offer to plan, install, finance and maintain a solar power system on a host building. In another embodiment, the developer 70 may obtain financing from the counterpart 810 after the landlord agrees to allow the developer 70 to build on the host 72 building. Generally, the new ISO 72 will pay little to nothing to the developer 70 for installing the solar system on the ISO's 72 building. Instead, the ISO 72 agrees to a solar service agreement (SSA) with a monthly energy charge for the solar system owned by the developer 70. The ISO 72 agrees to purchase some, or all the energy produced, by the developer's 70 solar power system at a consistent monthly payment, with periodized percent increases directly tied to the cost of the installed solar power system. The SSA is typically for about 75% (seventy five percent) of the total costs of the installed system. Once an agreement is made between the ISO 72, financial counterpart 76 and the developer 70, the developer 70 purchases and installs a solar array 820. Once installed, the ISO 72 pays the developer 70 for the energy kWh 14 provided to the ISO 72 from the installed solar system 830.

The ISO 72 then converts the monthly solar energy cost to rA2 840 as described above. The tenant 74 pays a rent to the ISO 72 as a $rA^2$ for energy 850 whether or not that energy is consumed by the tenant 74. Energy charge to the tenant 74 is not based on usage. The advantage to the tenant 74 is the cost is below market meter rate 80.

FIG. 9

Finally, in FIG. 9, we show key figures for a solar energy installation. The figure augments the FIGS. 4A to 4B above to add the calculations to convert the energy cost to fully-realized cost recapture plus profits per $A^2$ for the ISO 72.

From the previous figures, we had a Size of Roof square Area 20 of 160,000. To calculate the interior space $tA^2$ 912, we multiply the $A^2$ of the roof 20 by the number of floors 910 in the structure. So, 160,000×5 for a Total Area of Building Interior 912 of 800,000 $A^2$. This is a example embodiment of calculating interior $A^2$ and not a limiting example. As discussed previously, building owners have various methods of calculating a building total interior.

Next, the operator would record the common area cA2 914 resulting in a common area factor 916 (42,000÷800,000) of 1.0525. The operator may enter tenant's $uA^2$ 918, in this example of 2,210, or capture the number from other systems. We may also calculate the Monthly ISO costs 920 paid to the developer. Assuming a term of 15 years, an interest rate of 4%, and a recovery of system cost at 75%, we calculate the month payment as:

(((($4,493,862−$1,194,124−$337,320)*75%)
  *4%*15)+($4,493,862−$1,194,124−$337,320))÷
  (15*12)

This gives us Monthly ISO Cost 920 of $23,863.92 in this example. The ISO may add a Mark-Up Percent 922, but at this time the operator is leaving the field at 0% until there is further analysis of the return in the subsequent row.

Through energy consultants, the operator has found the market meter rate $A^2$ 930 for an office complex in her geography is $0.1800 $A^2$. In this example method, the ISO feels that a 25% market meter rate discount 932 will capture new tenants and keep current tenants. Applying this discount 932, the tenant's Monthly Energy Cost A² 934 of only $0.1350 ($0.1800×(1−0.25)). This FIG. 934 may now be applied to the tenant's rentable area to arrive at the tenant's monthly solar energy rent 924 of $314.01 as:

(2210×1.0525)×$0.1350

To determine the ISO's monthly energy costs per A² paid to the developer 936, the operator divides the monthly ISO cost 920 by the total area of the building 912 ($23,862.92÷800,000) for a final monthly cost of $0.0298 A².

In another embodiment, the ISO 72 funds the solar energy installation without a developer 70. The ISO 72 either pays cash or finances the project directly with a financial institution, company or investor. In this embodiment, the ISO's monthly energy costs per A² are the amortized costs of the installation on a monthly basis.

Subtracting the monthly energy cost to tenant A² 934 from the ISO's monthly energy cost A² to the developer, we get an ISO monthly profit A² 938 of $0.1052 ($0.1350−$0.0298). For further analysis, the operator may multiply the total interior of the building 912 by the ISO Monthly Profit A² to determine total monthly new solar energy profit of $84,136.08 (800,000×$0.1052). If satisfied with the return, the operator may leave the Mark-Up Percent by the ISO 922 at 0% or adjust upwards as desired.

Although the present disclosure and its advantages have been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

In the foregoing description, and the following claims, method steps and/or actions are described in a particular order for the purposes of illustration. It should be appreciated that in alternate embodiments, the method steps and/or actions may be performed in a different order than that described. Additionally, the methods described above may be embodied in machine-executable instructions stored on one or more machine-readable mediums, such as disk drives, thumb drives or CD-ROMs. The instructions may be used to cause the machine (e.g., computer processor) programmed with the instructions to perform the method. Alternatively, the methods may be performed by a combination of hardware and software. While illustrative and presently preferred embodiments of the invention have been described in detail herein, it is to be understood that the inventive concepts may be otherwise variously embodied and employed, and that the appended claims are intended to be construed to include such variations, except as limited by the prior art.

Benefits, other advantages, and solutions to problems have been described herein with regard to specific embodiments. However, the advantages, associated benefits, specific solutions to problems, and any element(s) that may cause any benefit, advantage, or solution to occur or become more pronounced are not to be construed as critical, required, or essential features or elements of any or all the claims of the invention. As used herein, the terms "comprises", "comprising", or any other variation thereof, are intended to cover a non-exclusive inclusion, such that a process, method, article, or apparatus composed of a list of elements that may include other elements not expressly listed or inherent to such process, method, article, or apparatus.

Advantages

From the description, above, a number of advantages become evident for the "Converting Solar Output Measure to Commercial Rent-per-Square Area." The present invention provides all new benefits for systems and business methods, including:
  a) reducing the computing resources required for recording and processing the planning metadata;
  b) matching the cost per Area measure used to evaluate return on investment and internal rate of return in other areas of real estate;
  c) matching the price per square Area rent used in of a rental or lease agreement;
  d) providing a static, and predictable, per square Area rental cost to the tenant;
  e) providing a predictable and measurable new income per square Area to the ISO;
  f) providing a non-metered pro-rata cost sharing basis for solar cost per square Area;
  g) providing a consistent square Area rental payment for energy to the ISO whether the energy is used or not;
  h) eliminating the expense for sub-metering;
  i) providing a full return on monthly ISO costs paid to the developer;
  j) evaluating system profit by square Area;
  k) planning solar system size based on cost kWh for the market meter rate for business sector for the geographical area.

What is claimed is:

1. A method executed on a computing device for generating a less than maximum bifacial solar panel schematic, the method comprising:
  a. through a client interface, selecting a financial objective of roof and array dollar depreciation stored on an analytic server;
  b. on an analytic server, record the size of roof's worksite space;
  c. on the analytic server, record an estimate of a features space and multiply into a size of the roof to calculate a usable roof size;
  d. on the analytics server, calculating, by one or more processing units, a maximum number of panels by dividing a footprint of each bifacial panel added to the panel's inter-row space into the usable roof size;
  e. on the analytics server, using the financial objective, calculate, by one or more processing units, a less than maximum number of the bifacial solar panels that does not exceed the depreciation associated with the maximum number of panels;
  f. on the analytics server, calculating, by one or more processing units, a rented solar energy by the square Area by dividing Monthly Total System Cost by total square Area of building's interior;
  g. through a communication application transfer cost per square area to store in a memory of a other devices;

h. on the client interface, display, by one or more processing units, the results of less than maximum number of the bifacial retrieved from the analytics server;
i. on the client interface, generate, by one or more processing units, a roof's worksite border image on a schematic;
j. on the client interface, add, by one or more processing units, one or more features on the worksite;
k. on the client interface, add, by one or more processing units, one or more modules on the worksite up to the less than maximum module count;
l. after placing each module on the schematic, the analytic server tests if the number of modules is illegal and prevents the addition of illegal modules on the worksite;
m. storing a design and publishing an informed schematic in a network environment, by one or more processing units, with a unified view of analysis and design, to other devices.

\* \* \* \* \*